United States Patent
Zunger et al.

(10) Patent No.: US 9,305,069 B2
(45) Date of Patent: Apr. 5, 2016

(54) METHOD AND SYSTEM FOR UPLOADING DATA INTO A DISTRIBUTED STORAGE SYSTEM

(75) Inventors: Yonatan Zunger, Mountain View, CA (US); Alexander Kesselman, Sunnyvale, CA (US); Alexandre Drobychev, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/023,384

(22) Filed: Feb. 8, 2011

(65) Prior Publication Data

US 2011/0196822 A1    Aug. 11, 2011

Related U.S. Application Data

(60) Provisional application No. 61/302,904, filed on Feb. 9, 2010.

(51) Int. Cl.
G06F 7/00 (2006.01)
G06F 17/00 (2006.01)
G06F 17/30 (2006.01)

(52) U.S. Cl.
CPC .... *G06F 17/30575* (2013.01); *G06F 17/30159* (2013.01)

(58) Field of Classification Search
None
See application file for complete search history.

(56) References Cited

U.S. PATENT DOCUMENTS

| | | |
|---|---|---|
| 5,781,912 A | 7/1998 | Demers et al. |
| 5,812,773 A | 9/1998 | Norin |
| 5,829,046 A | 10/1998 | Tzelnic et al. |
| 6,167,427 A | 12/2000 | Rabinovich et al. |
| 6,189,011 B1 | 2/2001 | Lim et al. |
| 6,226,650 B1 | 5/2001 | Mahajan et al. |
| 6,263,364 B1 | 7/2001 | Najork et al. |
| 6,385,699 B1 | 5/2002 | Bozman et al. |
| 6,591,351 B1 | 7/2003 | Urabe et al. |
| 6,728,751 B1 | 4/2004 | Cato et al. |

(Continued)

FOREIGN PATENT DOCUMENTS

| | | |
|---|---|---|
| CN | 1776595 A | 5/2006 |
| EP | 1 860 542 A2 | 11/2007 |

OTHER PUBLICATIONS

Google Inc., PCT/US2011/024246, Feb. 9, 2011, International Search Report and Written Opinion mailed Apr. 26, 2011, 9 pgs.

(Continued)

*Primary Examiner* — Jau-Shya Meng
(74) *Attorney, Agent, or Firm* — Morgan, Lewis & Bockius LLP

(57) ABSTRACT

A method for uploading an object into a distributed storage system is implemented at a computing device The computing device splits an object into one or more chunks and uploads the one or more chunks into the distributed storage system. For each uploaded chunk, the computing device receives a write token from the distributed storage system, inserts an entry into an extents table of the object for the chunk in accordance with the received write token and the chunk ID, chunk offset, and chunk size of the chunk, generates a digest of the extents table, the digest representing the one or more chunks that the client expects to be within the distributed storage system, and sends the digest of the extents table to the distributed storage system. The distributed storage system is configured to use the digest to determine whether it has each of the one or more client-expected chunks.

22 Claims, 14 Drawing Sheets

(56) References Cited

U.S. PATENT DOCUMENTS

| | | | |
|---|---|---|---|
| 6,832,227 B2 | 12/2004 | Seki et al. | |
| 6,857,012 B2 | 2/2005 | Sim et al. | |
| 6,883,068 B2 | 4/2005 | Tsirigotis et al. | |
| 6,898,609 B2 | 5/2005 | Kerwin | |
| 6,973,464 B1 | 12/2005 | Gao | |
| 7,107,419 B1 | 9/2006 | Ghemawat et al. | |
| 7,155,463 B1 | 12/2006 | Wang et al. | |
| 7,251,670 B1 | 7/2007 | Day | |
| 7,293,154 B1 | 11/2007 | Karr et al. | |
| 7,320,059 B1 | 1/2008 | Armangau et al. | |
| 7,450,503 B1 | 11/2008 | Ginjpalli et al. | |
| 7,506,338 B2 | 3/2009 | Alpern et al. | |
| 7,558,927 B2 | 7/2009 | Clark et al. | |
| 7,567,973 B1 | 7/2009 | Burrows et al. | |
| 7,571,144 B2 | 8/2009 | Beckstrom et al. | |
| 7,647,329 B1 | 1/2010 | Fischman et al. | |
| 7,653,668 B1 | 1/2010 | Shelat et al. | |
| 7,660,836 B2 | 2/2010 | Bolik et al. | |
| 7,693,882 B2 | 4/2010 | Lee et al. | |
| 7,716,171 B2 | 5/2010 | Kryger | |
| 7,761,412 B2 | 7/2010 | Talius et al. | |
| 7,761,678 B1 * | 7/2010 | Bodmer et al. | 711/165 |
| 7,774,444 B1 | 8/2010 | George et al. | |
| 7,778,972 B1 | 8/2010 | Cormie et al. | |
| 7,778,984 B2 | 8/2010 | Zhang et al. | |
| 7,885,928 B2 | 2/2011 | Harrington et al. | |
| 7,900,002 B2 * | 3/2011 | Lyon | 711/161 |
| 7,958,088 B2 | 6/2011 | Yerneni et al. | |
| 8,010,514 B2 | 8/2011 | Zhang et al. | |
| 8,099,388 B2 | 1/2012 | Shen et al. | |
| 8,112,510 B2 | 2/2012 | Alon et al. | |
| 8,190,561 B1 | 5/2012 | Poole et al. | |
| 8,484,206 B2 | 7/2013 | Schmidt et al. | |
| 2002/0078300 A1 | 6/2002 | Dharap | |
| 2002/0147774 A1 | 10/2002 | Lisiecki et al. | |
| 2003/0033308 A1 | 2/2003 | Patel et al. | |
| 2003/0056082 A1 | 3/2003 | Maxfield | |
| 2003/0149709 A1 | 8/2003 | Banks | |
| 2003/0154449 A1 | 8/2003 | Teig et al. | |
| 2004/0199810 A1 | 10/2004 | Tarcea et al. | |
| 2004/0215650 A1 | 10/2004 | Shaji et al. | |
| 2004/0236763 A1 | 11/2004 | Krishnamoorthy et al. | |
| 2004/0255003 A1 | 12/2004 | Tecu et al. | |
| 2005/0097285 A1 | 5/2005 | Karamanolis et al. | |
| 2005/0125325 A1 | 6/2005 | Chai et al. | |
| 2005/0160078 A1 | 7/2005 | Benson et al. | |
| 2005/0198359 A1 | 9/2005 | Basani et al. | |
| 2006/0026219 A1 | 2/2006 | Orenstein et al. | |
| 2006/0078159 A1 | 4/2006 | Hamatake et al. | |
| 2006/0112140 A1 | 5/2006 | McBride et al. | |
| 2006/0221190 A1 | 10/2006 | Limberis et al. | |
| 2006/0253498 A1 | 11/2006 | Barrs et al. | |
| 2006/0253503 A1 | 11/2006 | Barrs et al. | |
| 2007/0050415 A1 | 3/2007 | Armangau et al. | |
| 2007/0078901 A1 | 4/2007 | Satou et al. | |
| 2007/0124415 A1 * | 5/2007 | Lev-Ran et al. | 709/217 |
| 2007/0143372 A1 | 6/2007 | Martinez et al. | |
| 2007/0156842 A1 | 7/2007 | Vermeulen et al. | |
| 2007/0174660 A1 | 7/2007 | Peddada | |
| 2007/0203910 A1 | 8/2007 | Ferguson et al. | |
| 2007/0266204 A1 | 11/2007 | Mizuno | |
| 2007/0283017 A1 | 12/2007 | Anand et al. | |
| 2008/0027884 A1 | 1/2008 | Boutault | |
| 2008/0147821 A1 | 6/2008 | Dietrich et al. | |
| 2009/0044128 A1 | 2/2009 | Baumgarten et al. | |
| 2009/0083342 A1 | 3/2009 | Tomic et al. | |
| 2009/0083563 A1 * | 3/2009 | Murase | 711/162 |
| 2009/0222884 A1 | 9/2009 | Shaji et al. | |
| 2009/0228532 A1 * | 9/2009 | Anzai | 707/204 |
| 2009/0240664 A1 | 9/2009 | Dinker et al. | |
| 2009/0265519 A1 | 10/2009 | Moore et al. | |
| 2009/0271412 A1 | 10/2009 | Lacapra et al. | |
| 2009/0276408 A1 | 11/2009 | Auerbach et al. | |
| 2009/0327602 A1 | 12/2009 | Moore et al. | |
| 2010/0017037 A1 | 1/2010 | Nam et al. | |
| 2010/0057502 A1 | 3/2010 | Arguelles et al. | |
| 2010/0094981 A1 | 4/2010 | Cordray et al. | |
| 2010/0115216 A1 | 5/2010 | Jia et al. | |
| 2010/0138495 A1 | 6/2010 | McIntyre et al. | |
| 2010/0189262 A1 * | 7/2010 | Ducharme et al. | 706/47 |
| 2010/0241660 A1 | 9/2010 | Bhorania et al. | |
| 2010/0274762 A1 | 10/2010 | Murphy et al. | |
| 2010/0281051 A1 | 11/2010 | Sheffi et al. | |
| 2010/0325476 A1 | 12/2010 | Zhang et al. | |
| 2011/0016429 A1 | 1/2011 | Yoshihama | |
| 2011/0185013 A1 | 7/2011 | Obata et al. | |
| 2011/0196832 A1 | 8/2011 | Zunger et al. | |
| 2011/0238625 A1 | 9/2011 | Hamaguchi et al. | |

OTHER PUBLICATIONS

Google Inc., PCT/US2011/024247, Feb. 9, 2011, International Search Report and Written Opinion mailed Sep. 23, 2011, 15 pgs.

Google Inc., PCT/US2011/024249, Feb. 9, 2011, International Search Report and Written Opinion mailed Apr. 26, 2011, 10 pgs.

Chang et al., "Bigtable: A Distributed Storage System for Structured Data," OSDI, Oct. 31, 2006, 1-14 pgs.

Ghemawat et al., "The Google File System," SOSP' 03, Oct. 19-22, 2003, 15 pgs.

Google Code, "Protocol Buffers Language Guide," Jul. 11, 2008, 16 pgs. http://code.google.com/apis/protocolbuffers/docs/proto.html.

Korn et al., "The VCDIFF Generic Differencing and Compression Data Format," RFC 3284, Jun. 2002, 1-29 pgs.

Barrett, How Index Building Works, Google Code, Nov. 24, 2008, 3 pgs.

Xu, A Dynamic Distributed Replica Management Mechanism Based on Accessing Frequency Detecting, ACM SIGOPS, vol. 38, iss. 3, 2004, 9 pgs.

Google Inc., Communication Pursuant to Article 94(3) EPC, European Patent Application No. 11704384.4, May 30, 2014, 6 pgs.

Google Inc., Communication Pursuant to Article 94(3) EPC, European Patent Application No. 11704385.1, Nov. 8, 2013, 5 pgs.

Google Inc., Communication Pursuant to Article 94(3) EPC, EP 11704384.4, Nov. 8, 2013, 5 pgs.

Google Inc., Communication Pursuant to Article 94(3) EPC, EP 11705357.9, Dec. 5, 2013, 6 pgs.

Little, The Replica Management System: a Scheme for Flexible and Dynamic Replication, IEEE Proceedings of Second Workshop on Configurable Distributed Systems, Mar. 1994, pp. 1-12.

Google Inc., Communication under Rule 71(3) EPC, EP 11704384.4, Jun. 24, 2015, 8 pgs.

Google Inc., Communication Pursuant to Article 94(3) EPC, EP 11705357.9, Oct. 10, 2014, 6 pgs.

Google Inc., Decision to Refuse a European Patent application, EP 11704385.1, Apr. 22, 2015, 12 pgs.

Google Inc., Notification of First Office Action, CN 201180017920.9, Dec. 26, 2014, 21 pgs.

Google Inc., Summons to Attend Oral Proceedings pursuant to Rule 115(1) EPC, EP 11704384.4, Jan. 23, 2015, 7 pgs.

Google Inc., Summons to Attend Oral Proceedings pursuant to Rule 115(1) EPC, EP 11704385.1, Sep. 16, 2014, 6 pgs.

* cited by examiner

Server Allocation

| Task / Function | Typical Number of Servers at an Instance |
|---|---|
| 502 — Blobmaster | 10 |
| 504 — Bitpusher | 100 |
| 506 — BigTable Servers | 50 |
| 508 — File System Servers | 1000 |
| 510 — Tape Servers | 10 |
| 512 — Tape Master | 5 |
| 514 — Replication Management | 10 |
| 516 — Quorum Clock Server | 5 |

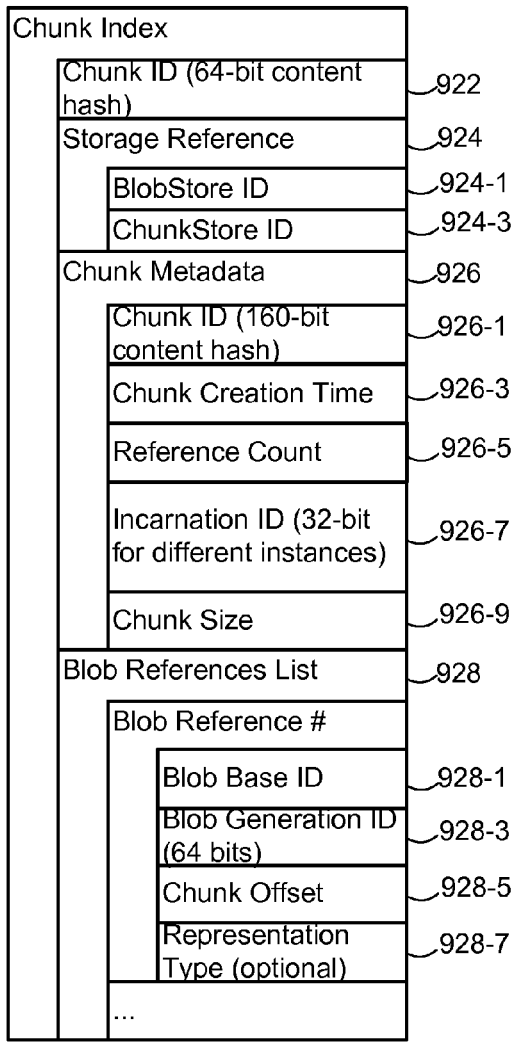
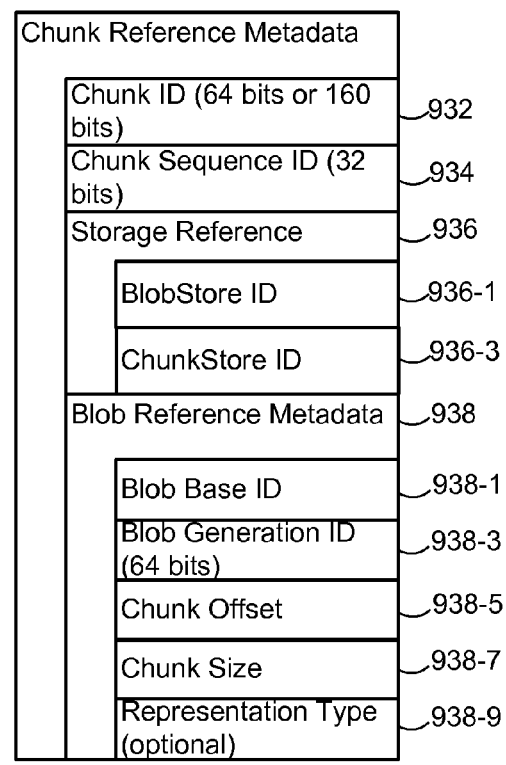
Figure 9C
Figure 9B

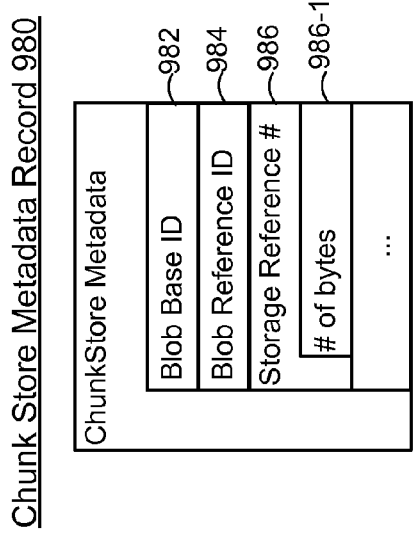
Figure 9G
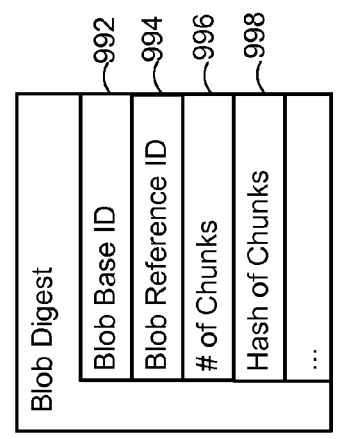
Figure 9H
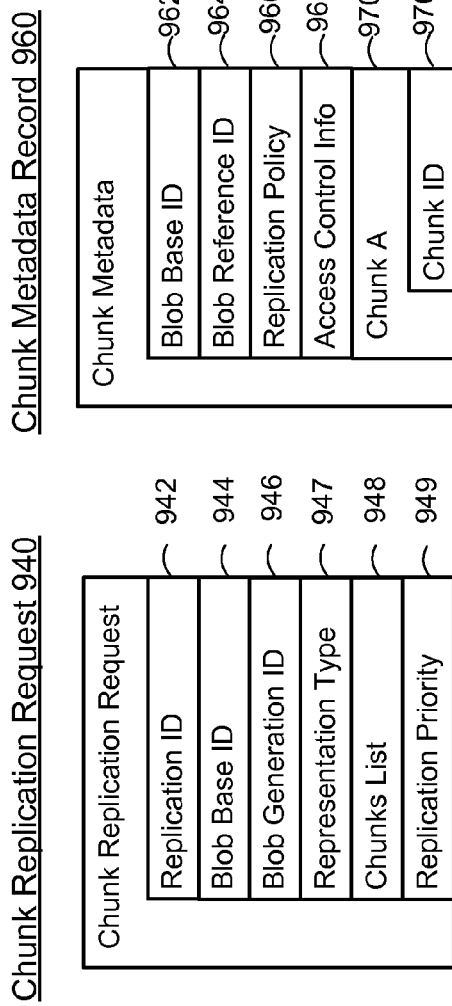
Figure 9F
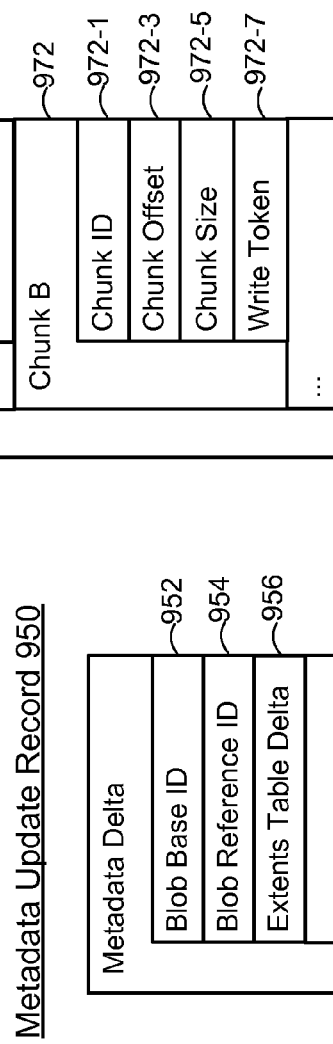
Figure 9D
Figure 9E

METHOD AND SYSTEM FOR UPLOADING DATA INTO A DISTRIBUTED STORAGE SYSTEM

PRIORITY

This application claims priority to U.S. Provisional Application Ser. No. 61/302,904, filed Feb. 9, 2010, entitled "Method and System for Uploading Data Into a Distributed Storage System", which is incorporated by reference herein in its entirety.

TECHNICAL FIELD

The disclosed embodiments relate generally to database replication, and more specifically to method and system for uploading data objects into a distributed storage system.

BACKGROUND

For weakly mutable data, changes or mutations at one instance (or replica) of the data must ultimately replicate to all other instances of the database, but there is no strict time limit on when the updates must occur. This is an appropriate model for certain data that does not change often, particular when there are many instances of the database at locations distributed around the globe.

Replication of large quantities of data on a planetary scale can be both slow and inefficient. In particular, the long-haul network paths have limited bandwidth. In general, a single change to a large piece of data entails transmitting that large piece of data through the limited bandwidth of the network. Furthermore, the same large piece of data is transmitted to each of the database instances, which multiplies the bandwidth usage by the number of database instances.

In addition, network paths and data centers sometimes fail or become unavailable for periods of time (both unexpected outages as well as planned outages for upgrades, etc.). Generally, replicated systems do not handle such outages gracefully, often requiring manual intervention. When replication is based on a static network topology and certain links become unavailable or more limited, replication strategies based on the original static network may be inefficient or ineffective.

SUMMARY

The above deficiencies and other problems associated with replicating data for a distributed database to multiple replicas across a widespread distributed system are addressed by the disclosed embodiments. In some of the disclosed embodiments, changes to an individual piece of data are tracked as deltas, and the deltas are transmitted to other instances of the database rather than transmitting the piece of data itself. In some embodiments, reading the data includes reading both an underlying value and any subsequent deltas, and thus a client reading the data sees the updated value even if the deltas has not been incorporated into the underlying data value. In some embodiments, distribution of the data to other instances takes advantage of the network tree structure to reduce the amount of data transmitted across the long-haul links in the network. For example, data that needs to be transmitted from Los Angeles to both Paris and Frankfurt could be transmitted to Paris, with a subsequent transmission from Paris to Frankfurt.

In accordance with some embodiments, a computer-implemented method for uploading an object into a distributed storage system is implemented at a computing device having one or more processors and memory. The memory stores one or more programs for execution by the one or more processors on the computing device, which is associated with a distributed storage system that includes a plurality of chunk stores. The computing device splits an object into one or more chunks, wherein the one or more chunks have a predefined sequence and each chunk has a chunk ID, a chunk offset, and a chunk size, and uploads the one or more chunks into the distributed storage system. For each uploaded chunk, the computing device receives a write token from the distributed storage system, wherein the write token identifies a respective chunk store that stores the chunk, inserts an entry into an extents table of the object for the chunk in accordance with the received write token and the chunk ID, chunk offset, and chunk size of the chunk, generates a digest of the extents table, wherein the digest represents the one or more chunks that the client expects to be within the distributed storage system, and sends the digest of the extents table to the distributed storage system, wherein the distributed storage system is configured to use the digest to determine whether it has each of the one or more client-expected chunks.

In some embodiments, the computing device inserts a dummy entry into the extents table for each gap between two consecutive but non-contiguous chunks of the object in accordance with the predefined sequence. The dummy entry corresponds to a dummy chunk that has a predefined chunk ID, a chunk offset, and a chunk size.

In some embodiments, the client is configured to choose a destination chunk store for the object to be the chunk store that has more bytes of the object than any other chunk stores of the distributed storage system.

In some embodiments, the one or more chunks have the same chunk size. In some other embodiments, at least two of the one or more chunks have two different chunk sizes.

In some embodiments, each of the plurality of chunk stores has a respective store type. The computing device uploads the one or more chunks to the plurality of chunk stores by choosing a store type in accordance with a total size of the object and a user-specified storage policy for the object and notifying the distributed storage system of the chosen store type such that the one or more chunks are uploaded into a subset of the plurality of chunk stores that have the chosen store type.

In some embodiments, the write token includes the uploaded chunk's chunk ID, the respective chunk store's chunkstore ID, and a cryptographic signature associated with the uploaded chunk.

In some embodiments, the extents table defines a map from a logical byte range of the object to one or more chunk IDs of the one or more chunks stored within the distributed storage system.

In some embodiments, the digest of the extents table further includes a total number of chunks of the object that the client expects to be within the distributed storage system.

In accordance with some embodiments, a computer-implemented method for storing an object is implemented at a distributed storage system having a plurality of chunk stores. The distributed storage system receives from a client a request to store an object having one or more chunks, wherein the one or more chunks have a predefined sequence and each chunk has a chunk ID, a chunk offset, and a chunk size. For each received chunk, the distributed storage system identifies a respective chunk store in accordance with a load balance of the distribute storage system, stores the chunk within the identified chunk store, and returns a write token for the chunk to the client, wherein the client is configured to insert an entry into an extents table of the object for the chunk in accordance with the write token and the chunk ID, chunk offset, and chunk size of the chunk. The distributed storage system receives a digest of the extents table of the object from the client, wherein the digest represents the one or more chunks that the client expects to be within the distributed storage system, and determines whether the distributed storage system has the one or more client-expected chunks in accordance with the received digest.

In some embodiments, the digest includes information of at least one dummy entry in the extents table, wherein the dummy entry corresponds to a gap between two consecutive but non-contiguous chunks of the object in accordance with the predefined sequence. The dummy entry corresponds to a dummy chunk that has a predefined chunk ID, a chunk offset, and a chunk size.

In accordance with some embodiments, a computer system includes one or more processors, memory, and one or more programs stored in the memory for execution by the one or more processors. The one or more programs include instructions for: receiving from a client a request to store an object having one or more chunks, wherein the one or more chunks have a predefined sequence and each chunk has a chunk ID, a chunk offset, and a chunk size; for each received chunk, identifying a respective chunk store in accordance with a load balance of the distribute storage system; storing the chunk within the identified chunk store; and returning a write token for the chunk to the client, wherein the client is configured to insert an entry into an extents table of the object for the chunk in accordance with the write token and the chunk ID, chunk offset, and chunk size of the chunk; receiving a digest of the extents table of the object from the client, wherein the digest represents the one or more chunks that the client expects to be within the distributed storage system; and determining whether the distributed storage system has the one or more client-expected chunks in accordance with the received digest.

In accordance with some embodiments, a computer readable storage medium stores one or more programs configured for execution by a server computer system having one or more processors and memory storing one or more programs for execution by the one or more processors. The one or more programs comprise instructions to: receive from a client a request to store an object having one or more chunks, wherein the one or more chunks have a predefined sequence and each chunk has a chunk ID, a chunk offset, and a chunk size; for each received chunk, identify a respective chunk store in accordance with a load balance of the distribute storage system; store the chunk within the identified chunk store; and return a write token for the chunk to the client, wherein the client is configured to insert an entry into an extents table of the object for the chunk in accordance with the write token and the chunk ID, chunk offset, and chunk size of the chunk; receive a digest of the extents table of the object from the client, wherein the digest represents the one or more chunks that the client expects to be within the distributed storage system; and determine whether the distributed storage system has the one or more client-expected chunks in accordance with the received digest.

Thus methods and systems are provided that make replication of data in distributed databases faster, and enable more efficient use of network resources. Faster replication results in providing users with updated information (or access to information) more quickly; and more efficient usage of network bandwidth leaves more bandwidth available for other tasks, making other processes run faster.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 9A-9H illustrate block diagrams and data structures used for uploading data from a client into a planet-scale distributed storage system according to some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

DESCRIPTION OF EMBODIMENTS

Figure 1A:
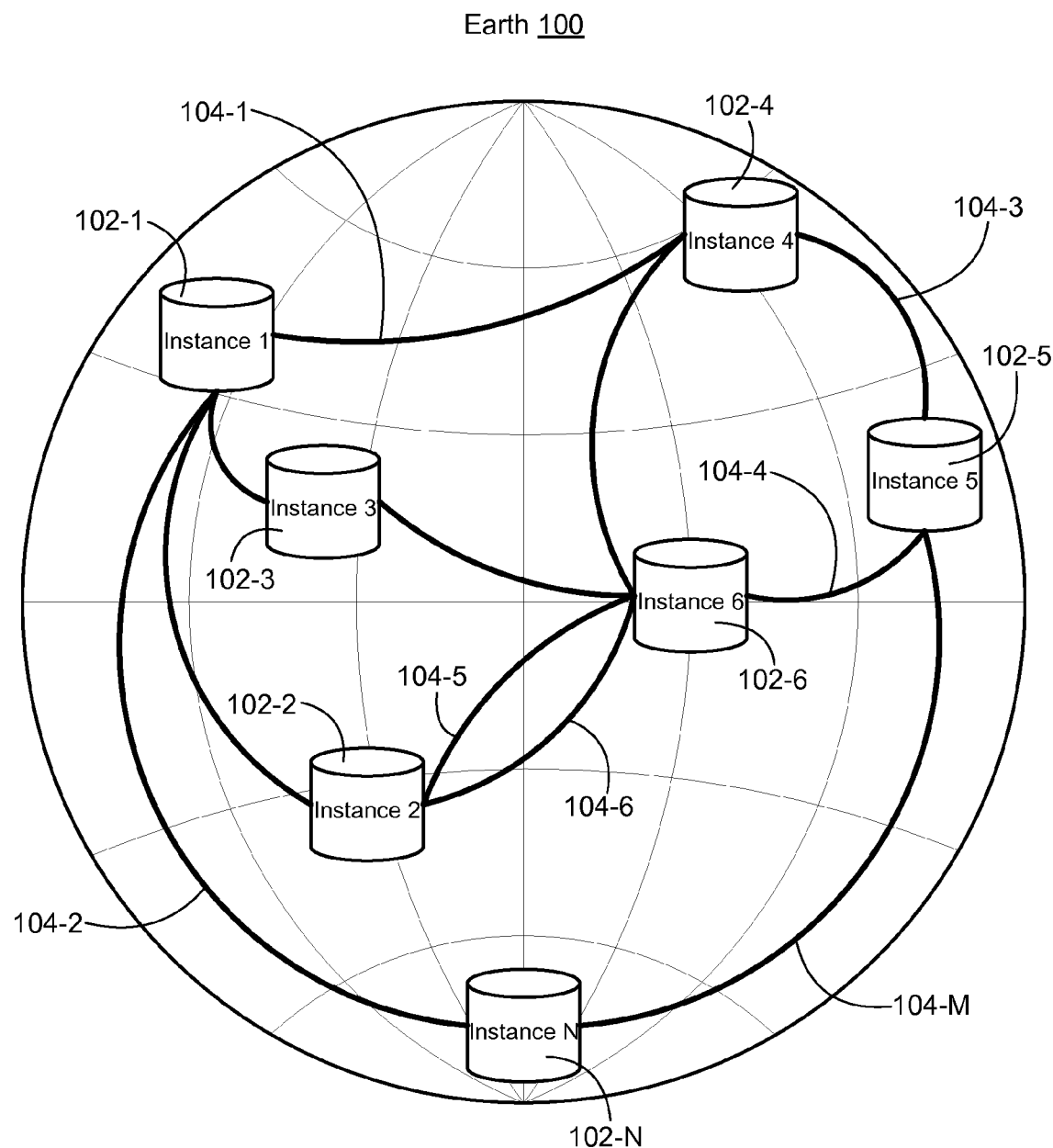
FIG. 1A is a conceptual illustration for placing multiple instances of a database at physical sites all over the globe according to some embodiments.

The present specification describes a distributed storage system. In some embodiments, as illustrated in FIG. 1A, the distributed storage system is implemented on a global or planet-scale. In these embodiments, there is a plurality of instances 102-1, 102-2, . . . 102-N at various locations on the Earth 100, connected by network communication links 104-

Figure 2:
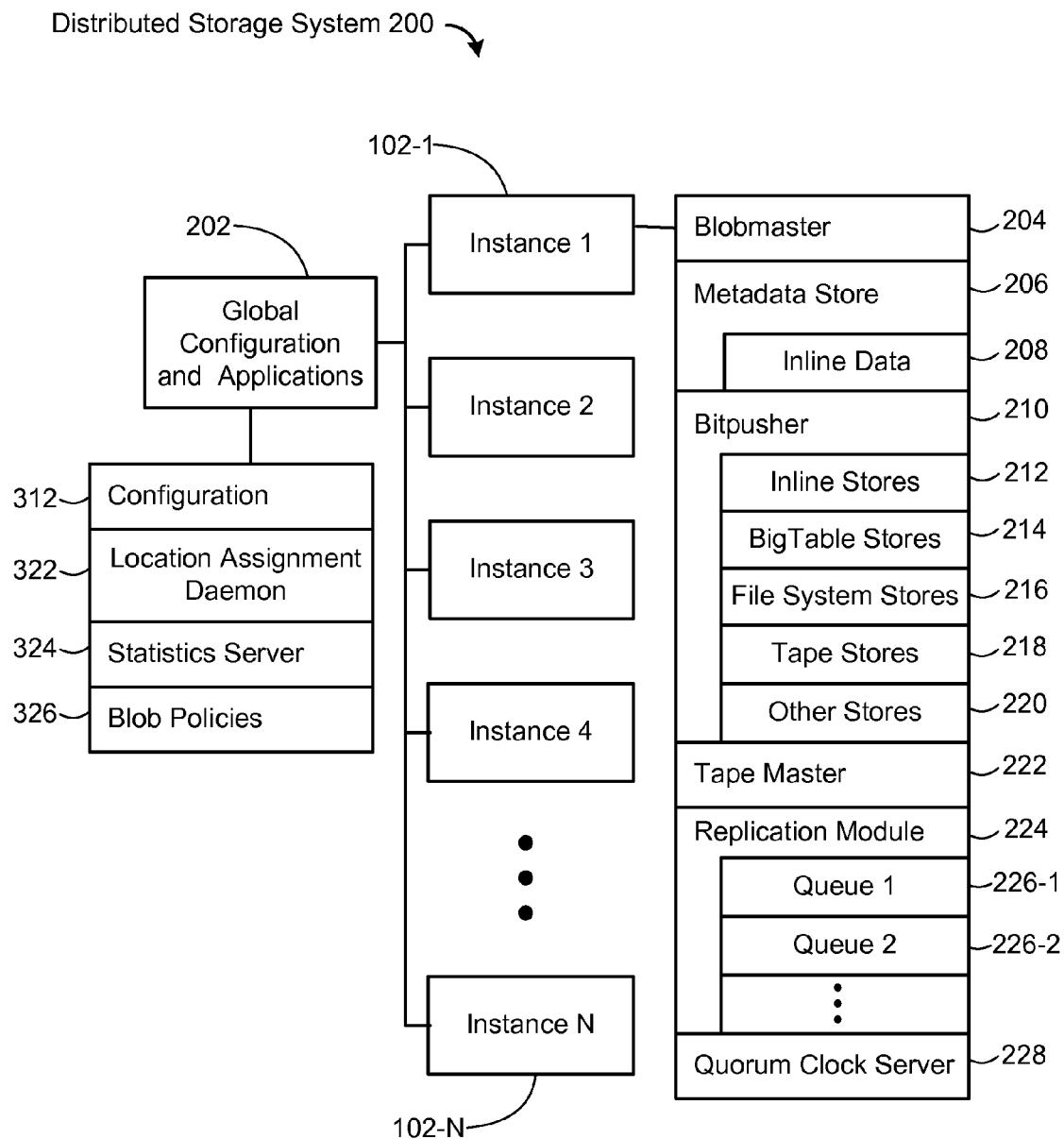
FIG. 2 is a block diagram illustrating multiple instances of a replicated database, with an exemplary set of programs and/or processes shown for the first instance according to some embodiments.
Figure 3:
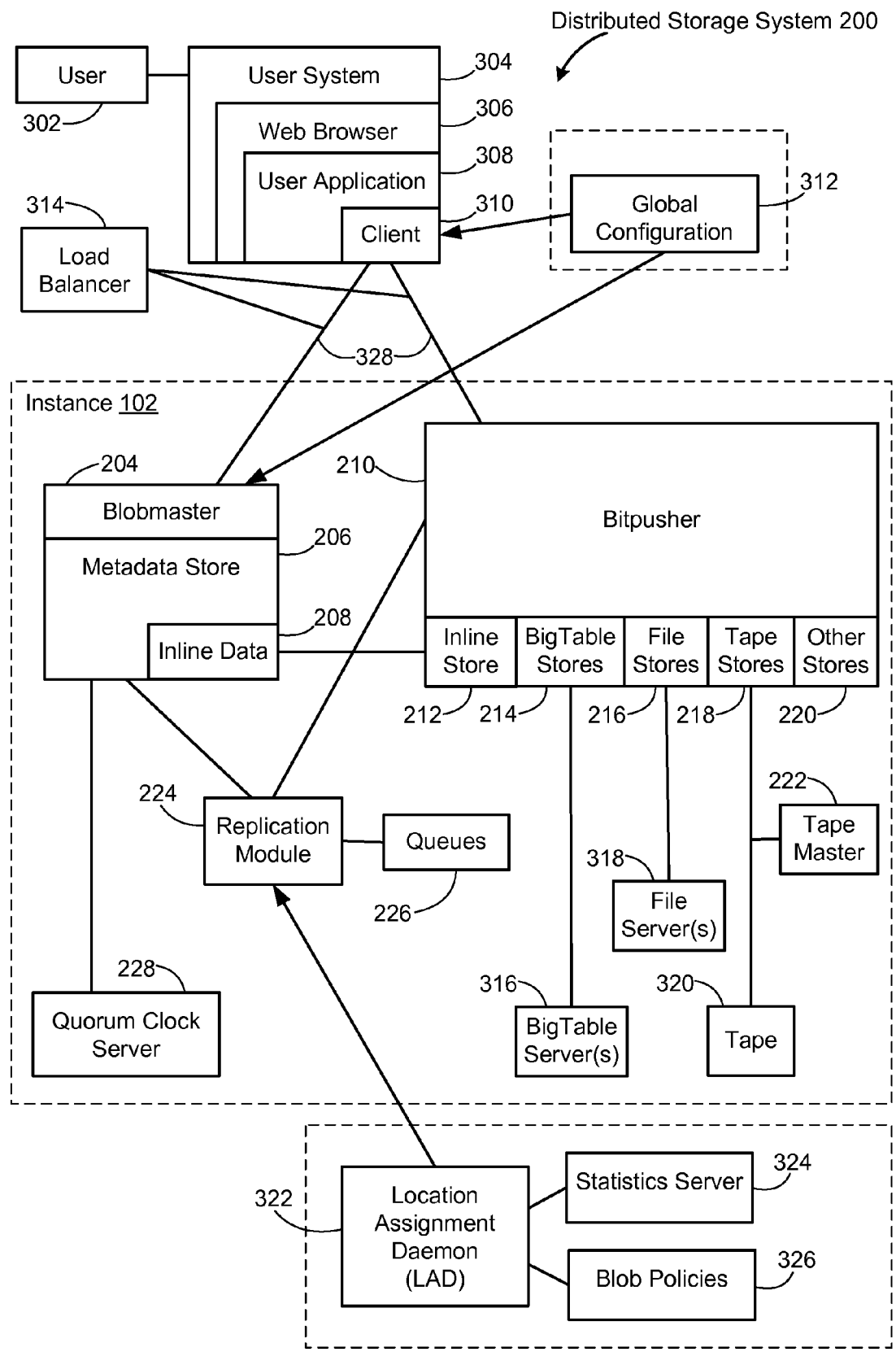
FIG. 3 is a block diagram that illustrates an exemplary instance for the system, and illustrates what blocks within the instance a user interacts with according to some embodiments.

1, 104-2, ... 104-M. In some embodiments, an instance (such as instance 102-1) corresponds to a data center. In other embodiments, multiple instances are physically located at the same data center. Although the conceptual diagram of FIG. 1 shows a limited number of network communication links 104-1, etc., typical embodiments would have many more network communication links. In some embodiments, there are two or more network communication links between the same pair of instances, as illustrated by links 104-5 and 104-6 between instance 2 (102-2) and instance 6 (102-6). In some embodiments, the network communication links are composed of fiber optic cable. In some embodiments, some of the network communication links use wireless technology, such as microwaves. In some embodiments, each network communication link has a specified bandwidth and/or a specified cost for the use of that bandwidth. In some embodiments, statistics are maintained about the transfer of data across one or more of the network communication links, including throughput rate, times of availability, reliability of the links, etc. Each instance typically has data stores and associated databases (as shown in FIGS. 2 and 3), and utilizes a farm of server computers ("instance servers," see FIG. 4) to perform all of the tasks. In some embodiments, there are one or more instances that have limited functionality, such as acting as a repeater for data transmissions between other instances. Limited functionality instances may or may not have any of the data stores depicted in FIGS. 3 and 4.

Figure 1B:
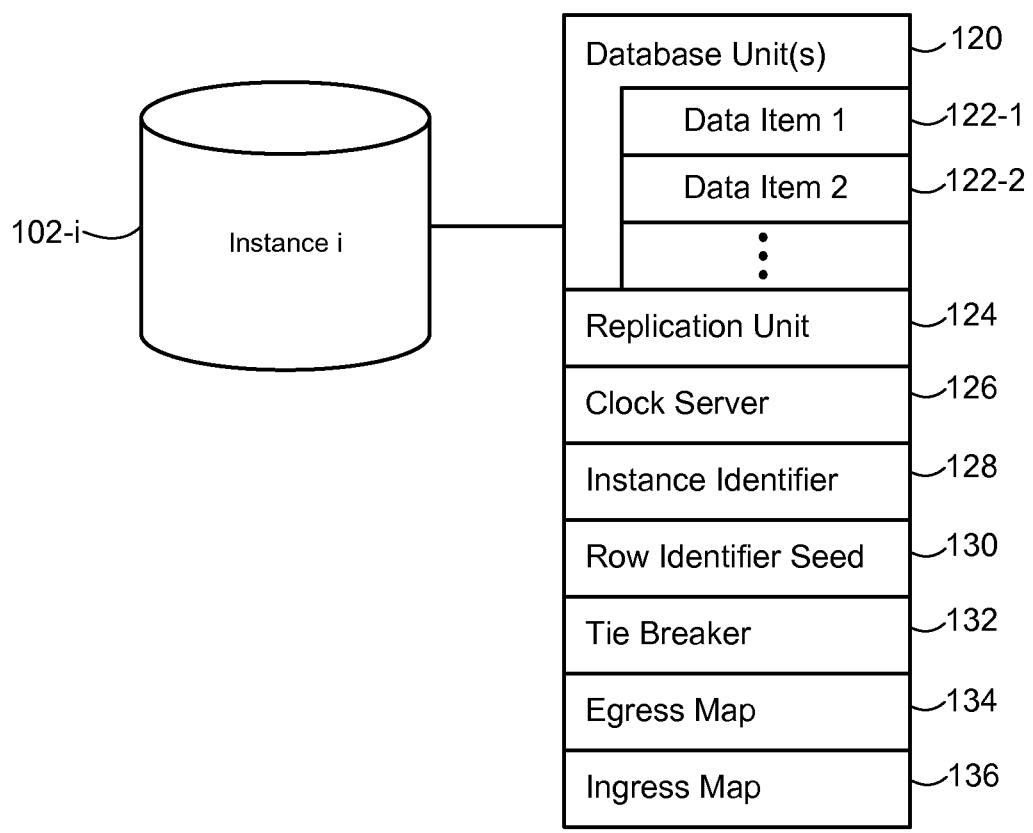
FIG. 1B illustrates basic functionality at each instance according to some embodiments.

FIG. 1B illustrates data and programs at an instance 102-*i* that store and replicate data between instances. The underlying data items 122-1, 122-2, etc. are stored and managed by one or more database units 120. Each instance 102-*i* has a replication unit 124 that replicates data to and from other instances. The replication unit 124 also manages one or more egress maps 134 that track data sent to and acknowledged by other instances. Similarly, the replication unit 124 manages one or more ingress maps, which track data received at the instance from other instances.

Each instance 102-*i* has one or more clock servers 126 that provide accurate time. In some embodiments, the clock servers 126 provide time as the number of microseconds past a well-defined point in the past. In preferred embodiments, the clock servers provide time readings that are guaranteed to be monotonically increasing. In some embodiments, each instance server 102-*i* stores an instance identifier 128 that uniquely identifies itself within the distributed storage system. The instance identifier may be saved in any convenient format, such as a 32-bit integer, a 64-bit integer, or a fixed length character string. In some embodiments, the instance identifier is incorporated (directly or indirectly) into other unique identifiers generated at the instance. In some embodiments, an instance 102-*i* stores a row identifier seed 130, which is used when new data items 122 are inserted into the database. A row identifier is used to uniquely identify each data item 122. In some embodiments, the row identifier seed is used to create a row identifier, and simultaneously incremented, so that the next row identifier will be greater. In other embodiments, unique row identifiers are created from a timestamp provided by the clock servers 126, without the use of a row identifier seed. In some embodiments, a tie breaker value 132 is used when generating row identifiers or unique identifiers for data changes (described below with respect to FIGS. 6-7). In some embodiments, a tie breaker 132 is stored permanently in non-volatile memory (such as a magnetic or optical disk).

The elements described in FIG. 1B are incorporated in embodiments of the distributed storage system 200 illustrated in FIGS. 2 and 3. In some embodiments, the functionality described in FIG. 1B is included in a blobmaster 204 and metadata store 206. In these embodiments, the primary data storage (i.e., blobs) is in the data stores 212, 214, 216, 218, and 220, and managed by bitpushers 210. The metadata for the blobs is in the metadata store 206, and managed by the blobmaster 204. The metadata corresponds to the functionality identified in FIG. 1B. Although the metadata for storage of blobs provides an exemplary embodiment of the present invention, one of ordinary skill in the art would recognize that the present invention is not limited to this embodiment.

The distributed storage system 200 shown in FIGS. 2 and 3 includes certain global applications and configuration information 202, as well as a plurality of instances 102-1, ... 102-N. In some embodiments, the global configuration information includes a list of instances and information about each instance. In some embodiments, the information for each instance includes: the set of storage nodes (data stores) at the instance; the state information, which in some embodiments includes whether the metadata at the instance is global or local; and network addresses to reach the blobmaster 204 and bitpusher 210 at the instance. In some embodiments, the global configuration information 202 resides at a single physical location, and that information is retrieved as needed. In other embodiments, copies of the global configuration information 202 are stored at multiple locations. In some embodiments, copies of the global configuration information 202 are stored at some or all of the instances. In some embodiments, the global configuration information can only be modified at a single location, and changes are transferred to other locations by one-way replication. In some embodiments, there are certain global applications, such as the location assignment daemon 346 (see FIG. 3) that can only run at one location at any given time. In some embodiments, the global applications run at a selected instance, but in other embodiments, one or more of the global applications runs on a set of servers distinct from the instances. In some embodiments, the location where a global application is running is specified as part of the global configuration information 202, and is subject to change over time.

FIGS. 2 and 3 illustrate an exemplary set of programs, processes, and data that run or exist at each instance, as well as a user system that may access the distributed storage system 200 and some global applications and configuration. In some embodiments, a user 302 interacts with a user system 304, which may be a computer or other device that can run a web browser 306. A user application 308 runs in the web browser, and uses functionality provided by database client 310 to access data stored in the distributed storage system 200 using network 328. Network 328 may be the Internet, a local area network (LAN), a wide area network (WAN), a wireless network (WiFi), a local intranet, or any combination of these. In some embodiments, a load balancer 314 distributes the workload among the instances, so multiple requests issued by a single client 310 need not all go to the same instance. In some embodiments, database client 310 uses information in a global configuration store 312 to identify an appropriate instance for a request. The client uses information from the global configuration store 312 to find the set of blobmasters 204 and bitpushers 210 that are available, and where to contact them. A blobmaster 204 uses a global configuration store 312 to identify the set of peers for all of the replication processes. A bitpusher 210 uses information in a global configuration store 312 to track which stores it is responsible for. In some embodiments, user application 308 runs on the user system 304 without a web browser 306. Exemplary user applications are an email application and an online video application.

In some embodiments, each instance has a blobmaster 204, which is a program that acts as an external interface to the metadata table 206. For example, an external user application 308 can request metadata corresponding to a specified blob using client 310. Note that a "blob" (i.e., a binary large object) is a collection of binary data (e.g., images, videos, binary files, executable code, etc.) stored as a single entity in a database. This specification uses the terms "blob" and "object" interchangeably and embodiments that refer to a "blob" may also be applied to "objects," and vice versa. In general, the term "object" may refer to a "blob" or any other object such as a database object, a file, or the like, or a portion (or subset) of the aforementioned objects. In some embodiments, every instance 102 has metadata in its metadata table 206 corresponding to every blob stored anywhere in the distributed storage system 200. In other embodiments, the instances come in two varieties: those with global metadata (for every blob in the distributed storage system 200) and those with only local metadata (only for blobs that are stored at the instance). In particular, blobs typically reside at only a small subset of the instances. The metadata table 206 includes information relevant to each of the blobs, such as which instances have copies of a blob, who has access to a blob, and what type of data store is used at each instance to store a blob. The exemplary data structures in FIGS. 8A-8E illustrate other metadata that is stored in metadata table 206 in some embodiments.

When a client 310 wants to read a blob of data, the blobmaster 204 provides one or more read tokens to the client 310, which the client 310 provides to a bitpusher 210 in order to gain access to the relevant blob. When a client 310 writes data, the client 310 writes to a bitpusher 210. The bitpusher 210 returns write tokens indicating that data has been stored, which the client 310 then provides to the blobmaster 204, in order to attach that data to a blob. A client 310 communicates with a bitpusher 210 over network 328, which may be the same network used to communicate with the blobmaster 204. In preferred embodiments, communication between the client 310 and bitpushers 210 is routed according to a load balancer 314. Because of load balancing or other factors, communication with a blobmaster 204 at one instance may be followed by communication with a bitpusher 210 at a different instance. For example, the first instance may be a global instance with metadata for all of the blobs, but may not have a copy of the desired blob. The metadata for the blob identifies which instances have copies of the desired blob, so in this example the subsequent communication with a bitpusher 210 to read or write is at a different instance.

A bitpusher 210 copies data to and from data stores. In some embodiments, the read and write operations comprise entire blobs. In other embodiments, each blob comprises one or more chunks, and the read and write operations performed by a bitpusher are on solely on chunks. In some of these embodiments, a bitpusher deals only with chunks, and has no knowledge of blobs. In preferred embodiments, a bitpusher has no knowledge of the contents of the data that is read or written, and does not attempt to interpret the contents. Embodiments of a bitpusher 210 support one or more types of data store. In preferred embodiments, a bitpusher supports a plurality of data store types, including inline data stores 212, BigTable stores 214, file server stores 216, and tape stores 218. Some embodiments support additional other stores 220, or are designed to accommodate other types of data stores as they become available or technologically feasible.

Inline stores 212 actually use storage space 208 in the metadata store 206. Inline stores provide faster access to the data, but have limited capacity, so inline stores are generally for relatively "small" blobs. In some embodiments, inline stores are limited to blobs that are stored as a single chunk. In some embodiments, "small" means blobs that are less than 32 kilobytes. In some embodiments, "small" means blobs that are less than 1 megabyte. As storage technology facilitates greater storage capacity, even blobs that are currently considered large may be "relatively small" compared to other blobs.

BigTable stores 214 store data in BigTables located on one or more BigTable database servers 316. BigTables are described in several publicly available publications, including "Bigtable: A Distributed Storage System for Structured Data," Fay Chang et al, OSDI 2006, which is incorporated herein by reference in its entirety. In preferred embodiments, the BigTable stores save data on a large array of servers 316.

File stores 216 store data on one or more file servers 318. In some embodiments, the file servers use file systems provided by computer operating systems, such as UNIX. In other embodiments, the file servers 318 implement a proprietary file system, such as the Google File System (GFS). GFS is described in multiple publicly available publications, including "The Google File System," Sanjay Ghemawat et al., SOSP'03, Oct. 19-22, 2003, which is incorporated herein by reference in its entirety. In other embodiments, the file servers 318 implement NFS (Network File System) or other publicly available file systems not implemented by a computer operating system. In preferred embodiments, the file system is distributed across many individual servers 318 to reduce risk of loss or unavailability of any individual computer.

Tape stores 218 store data on physical tapes 320. Unlike a tape backup, the tapes here are another form of storage. This is described in greater detail in co-pending U.S. Provisional Patent Application No. 61/302,909, filed Feb. 9, 2010, subsequently filed as U.S. patent application Ser. No. 13/023, 498, filed Feb. 8, 2011, "Method and System for Providing Efficient Access to a Tape Storage System," which is incorporated herein by reference in its entirety. In some embodiments, a Tape Master application 222 assists in reading and writing from tape. In some embodiments, there are two types of tape: those that are physically loaded in a tape device, so that the tapes can be robotically loaded; and those tapes that physically located in a vault or other offline location, and require human action to mount the tapes on a tape device. In some instances, the tapes in the latter category are referred to as deep storage or archived. In some embodiments, a large read/write buffer is used to manage reading and writing data to tape. In some embodiments, this buffer is managed by the tape master application 222. In some embodiments there are separate read buffers and write buffers. In some embodiments, a client 310 cannot directly read or write to a copy of data that is stored on tape. In these embodiments, a client must read a copy of the data from an alternative data source, even if the data must be transmitted over a greater distance.

In some embodiments, there are additional other stores 220 that store data in other formats or using other devices or technology. In some embodiments, bitpushers 210 are designed to accommodate additional storage technologies as they become available.

Each of the data store types has specific characteristics that make them useful for certain purposes. For example, inline stores provide fast access, but use up more expensive limited space. As another example, tape storage is very inexpensive, and provides secure long-term storage, but a client cannot directly read or write to tape. In some embodiments, data is automatically stored in specific data store types based on matching the characteristics of the data to the characteristics of the data stores. In some embodiments, users 302 who create files may specify the type of data store to use. In other embodiments, the type of data store to use is determined by the user application 308 that creates the blobs of data. In some embodiments, a combination of the above selection criteria is used. In some embodiments, each blob is assigned to a storage policy 326, and the storage policy specifies storage properties. A blob policy 326 may specify the number of copies of the blob to save, in what types of data stores the blob should be saved, locations where the copies should be saved, etc. For example, a policy may specify that there should be two copies on disk (Big Table stores or File Stores), one copy on tape, and all three copies at distinct metro locations. In some embodiments, blob policies 326 are stored as part of the global configuration and applications 202.

In some embodiments, each instance 102 has a quorum clock server 228, which comprises one or more servers with internal clocks. The order of events, including metadata deltas 608, is important, so maintenance of a consistent time clock is important. A quorum clock server regularly polls a plurality of independent clocks, and determines if they are reasonably consistent. If the clocks become inconsistent and it is unclear how to resolve the inconsistency, human intervention may be required. The resolution of an inconsistency may depend on the number of clocks used for the quorum and the nature of the inconsistency. For example, if there are five clocks, and only one is inconsistent with the other four, then the consensus of the four is almost certainly right. However, if each of the five clocks has a time that differs significantly from the others, there would be no clear resolution.

In some embodiments, each instance has a replication module 224, which identifies blobs or chunks that will be replicated to other instances. In some embodiments, the replication module 224 may use one or more queues 226-1, 226-2, . . . Items to be replicated are placed in a queue 226, and the items are replicated when resources are available. In some embodiments, items in a replication queue 226 have assigned priorities, and the highest priority items are replicated as bandwidth becomes available. There are multiple ways that items can be added to a replication queue 226. In some embodiments, items are added to replication queues 226 when blob or chunk data is created or modified. For example, if an end user 302 modifies a blob at instance 1, then the modification needs to be transmitted to all other instances that have copies of the blob. In embodiments that have priorities in the replication queues 226, replication items based on blob content changes have a relatively high priority. In some embodiments, items are added to the replication queues 226 based on a current user request for a blob that is located at a distant instance. For example, if a user in California requests a blob that exists only at an instance in India, an item may be inserted into a replication queue 226 to copy the blob from the instance in India to a local instance in California. That is, since the data has to be copied from the distant location anyway, it may be useful to save the data at a local instance. These dynamic replication requests receive the highest priority because they are responding to current user requests. The dynamic replication process is described in more detail in co-pending U.S. Provisional Patent Application Ser. No. 61/302,896, filed Feb. 9, 2010, subsequently filed as U.S. patent application Ser. No. 13/022,579, filed Feb. 7, 2011, "Method and System for Dynamically Replicating Data Within a Distributed Storage System," which is incorporated herein by reference in its entirety.

In some embodiments, there is a background replication process that creates and deletes copies of blobs based on blob policies 326 and blob access data provided by a statistics server 324. The blob policies specify how many copies of a blob are desired, where the copies should reside, and in what types of data stores the data should be saved. In some embodiments, a policy may specify additional properties, such as the number of generations of a blob to save, or time frames for saving different numbers of copies. E.g., save three copies for the first 30 days after creation, then two copies thereafter. Using blob policies 326, together with statistical information provided by the statistics server 324, a location assignment daemon 322 determines where to create new copies of a blob and what copies may be deleted. When new copies are to be created, records are inserted into a replication queue 226, with the lowest priority. The use of blob policies 326 and the operation of a location assignment daemon 322 are described in more detail in co-pending U.S. Provisional Patent Application Ser. No. 61/302,936, filed Feb. 9, 2010, subsequently filed as U.S. patent application 13/0252,290, filed Feb. 7, 2011, "System and Method for managing Replicas of Objects in a Distributed Storage System," which is incorporated herein by reference in its entirety.

Figure 4:
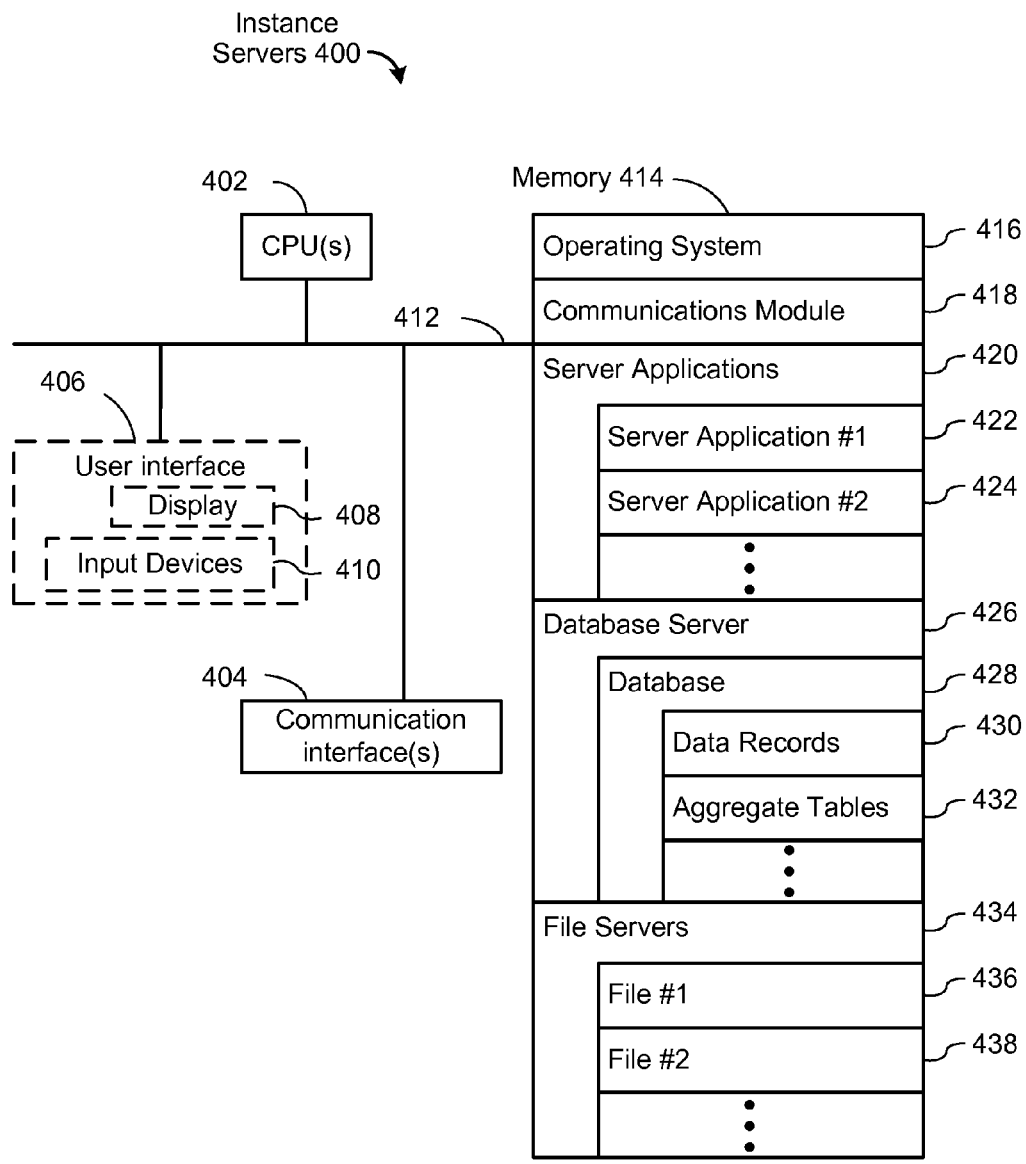
FIG. 4 is a block diagram of an instance server that may be used for the various programs and processes illustrated in FIGS. 1B, 2, and 3, according to some embodiments.

FIG. 4 is a block diagram illustrating an Instance Server 400 used for operations identified in FIGS. 2 and 3 in accordance with some embodiments of the present invention. An Instance Server 400 typically includes one or more processing units (CPU's) 402 for executing modules, programs and/or instructions stored in memory 414 and thereby performing processing operations; one or more network or other communications interfaces 404; memory 414; and one or more communication buses 412 for interconnecting these components. In some embodiments, an Instance Server 400 includes a user interface 406 comprising a display device 408 and one or more input devices 410. In some embodiments, memory 414 includes high-speed random access memory, such as DRAM, SRAM, DDR RAM or other random access solid state memory devices. In some embodiments, memory 414 includes non-volatile memory, such as one or more magnetic disk storage devices, optical disk storage devices, flash memory devices, or other non-volatile solid state storage devices. In some embodiments, memory 414 includes one or more storage devices remotely located from the CPU(s) 402. Memory 414, or alternately the non-volatile memory device(s) within memory 414, comprises a computer readable storage medium. In some embodiments, memory 414 or the computer readable storage medium of memory 414 stores the following programs, modules and data structures, or a subset thereof:

- an operating system 416 that includes procedures for handling various basic system services and for performing hardware dependent tasks;
- a communications module 418 that is used for connecting an Instance Server 400 to other Instance Servers or computers via the one or more communication network interfaces 404 (wired or wireless) and one or more communication networks 328, such as the Internet, other wide area networks, local area networks, metropolitan area networks, and so on;
- one or more server applications 420, such as a blobmaster 204 that provides an external interface to the blob metadata; a bitpusher 210 that provides access to read and write data from data stores; a replication module 224 that copies data from one instance to another; a quorum clock server 228 that provides a stable clock; a location assignment daemon 322 that determines where copies of a blob should be located; and other server functionality as illustrated in FIGS. 2 and 3. As illustrated, two or more server applications 422 and 424 may execute on the same physical computer;
- one or more database servers 426 that provides storage and access to one or more databases 428. The databases 428 may provide storage for metadata 206, replication queues 226, blob policies 326, global configuration 312, the statistics used by statistics server 324, as well as ancillary databases used by any of the other functionality. Each database 428 has one or more tables with data records 430. In some embodiments, some databases include aggregate tables 432, such as the statistics used by statistics server 324; and one or more file servers 434 that provide access to read and write files, such as file #1 (436) and file #2 (438). File server functionality may be provided directly by an operating system (e.g., UNIX or Linux), or by a software application, such as the Google File System (GFS).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 414 may store a subset of the modules and data structures identified above. Furthermore, memory 414 may store additional modules or data structures not described above.

Although FIG. 4 shows an instance server used for performing various operations or storing data as illustrated in FIGS. 2 and 3, FIG. 4 is intended more as functional description of the various features which may be present in a set of one or more computers rather than as a structural schematic of the embodiments described herein. In practice, and as recognized by those of ordinary skill in the art, items shown separately could be combined and some items could be separated. For example, some items shown separately in FIG. 4 could be implemented on individual computer systems and single items could be implemented by one or more computer systems. The actual number of computers used to implement each of the operations, databases, or file storage systems, and how features are allocated among them will vary from one implementation to another, and may depend in part on the amount of data at each instance, the amount of data traffic that an instance must handle during peak usage periods, as well as the amount of data traffic that an instance must handle during average usage periods.

Figures 5, 6:
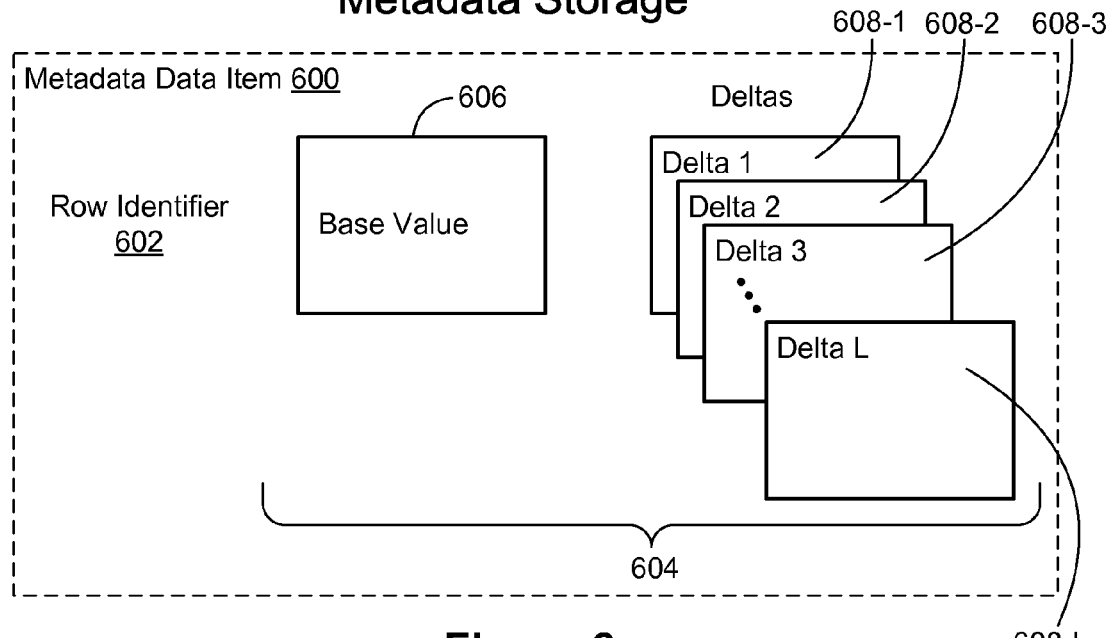
FIG. 5 illustrates a typical allocation of instance servers to various programs or processes illustrated in FIGS. 1B, 2, and 3, according to some embodiments.
FIG. 6 illustrates how metadata is stored according to some embodiments.

To provide faster responses to clients and to provide fault tolerance, each program or process that runs at an instance is generally distributed among multiple computers. The number of instance servers 400 assigned to each of the programs or processes can vary, and depends on the workload. FIG. 5 provides exemplary information about a typical number of instance servers 400 that are assigned to each of the functions. In some embodiments, each instance has about 10 instance servers performing (502) as blobmasters. In some embodiments, each instance has about 100 instance servers performing (504) as bitpushers. In some embodiments, each instance has about 50 instance servers performing (506) as BigTable servers. In some embodiments, each instance has about 1000 instance servers performing (508) as file system servers. File system servers store data for file system stores 216 as well as the underlying storage medium for BigTable stores 214. In some embodiments, each instance has about 10 instance servers performing (510) as tape servers. In some embodiments, each instance has about 5 instance servers performing (512) as tape masters. In some embodiments, each instance has about 10 instance servers performing (514) replication management, which includes both dynamic and background replication. In some embodiments, each instance has about 5 instance servers performing (516) as quorum clock servers.

FIG. 6 illustrates the storage of metadata data items 600 according to some embodiments. Each data item 600 has a unique row identifier 602. Each data item 600 is a row 604 that has a base value 606 and zero or more deltas 608-1, 608-2, ..., 608-L. When there are no deltas, then the value of the data item 600 is the base value 606. When there are deltas, the "value" of the data item 600 is computed by starting with the base value 606 and applying the deltas 608-1, etc. in order to the base value. A row thus has a single value, representing a single data item or entry. Although in some embodiments the deltas store the entire new value, in preferred embodiments the deltas store as little data as possible to identify the change. For example, metadata for a blob includes specifying what instances have the blob as well as who has access to the blob. If the blob is copied to an additional instance, the metadata delta only needs to specify that the blob is available at the additional instance. The delta need not specify where the blob is already located. As the number of deltas increases, the time to read data increases. The compaction process merges the deltas 608-1, etc. into the base value 606 to create a new base value that incorporates the changes in the deltas.

Although the storage shown in FIG. 6 relates to metadata for blobs, the same process is applicable to other non-relational databases, such as columnar databases, in which the data changes in specific ways. For example, an access control list may be implemented as a multi-byte integer in which each bit position represents an item, location, or person. Changing one piece of access information does not modify the other bits, so a delta to encode the change requires little space. In alternative embodiments where the data is less structured, deltas may be encoded as instructions for how to make changes to a stream of binary data. Some embodiments are described in publication RFC 3284, "The VCDIFF Generic Differencing and Compression Data Format," The Internet Society, 2002. One of ordinary skill in the art would thus recognize that the same technique applied here for metadata is equally applicable to certain other types of structured data.

Figure 7:
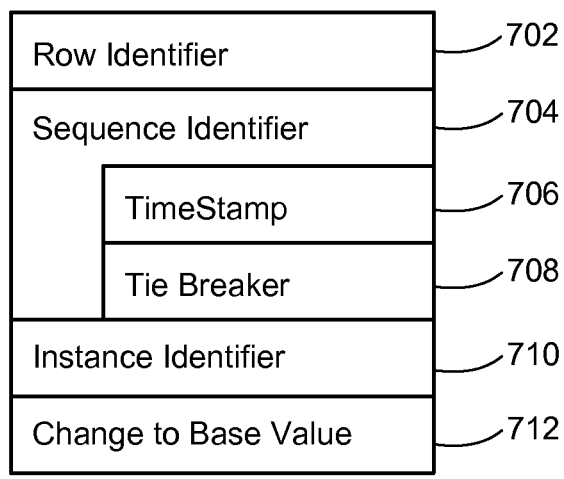
FIG. 7 illustrates an data structure that is used to store deltas according to some embodiments.

FIG. 7 illustrates an exemplary data structure to hold a delta. Each delta applies to a unique row, so the delta includes the row identifier 702 of the row to which it applies. In order to guarantee data consistency at multiple instances, the deltas must be applied in a well-defined order to the base value. The sequence identifier 704 is globally unique, and specifies the order in which the deltas are applied. In some embodiments, the sequence identifier comprises a timestamp 706 and a tie breaker value 708 that is uniquely assigned to each instance where deltas are created. In some embodiments, the timestamp is the number of microseconds past a well-defined point in time. In some embodiments, the tie breaker is computed as a function of the physical machine running the blobmaster as well as a process id. In some embodiments, the tie breaker includes an instance identifier, either alone, or in conjunction with other characteristics at the instance. In some embodiments, the tie breaker 708 is stored as a tie breaker value 132. By combining the timestamp 706 and a tie breaker 708, the sequence identifier is both globally unique and at least approximately the order in which the deltas were created. In certain circumstances, clocks at different instances may be slightly different, so the order defined by the sequence identifiers may not correspond to the "actual" order of events. However, in preferred embodiments, the "order," by definition, is the order created by the sequence identifiers. This is the order the changes will be applied at all instances.

A change to metadata at one instance is replicated to other instances. The actual change to the base value 712 may be stored in various formats. In some embodiments, data structures similar to those in FIGS. 8A-8E are used to store the changes, but the structures are modified so that most of the fields are optional. Only the actual changes are filled in, so the space required to store or transmit the delta is small. In other embodiments, the changes are stored as key/value pairs, where the key uniquely identifies the data element changed, and the value is the new value for the data element.

In some embodiments where the data items are metadata for blobs, deltas may include information about forwarding. Because blobs may be dynamically replicated between instances at any time, and the metadata may be modified at any time as well, there are times that a new copy of a blob does not initially have all of the associated metadata. In these cases, the source of the new copy maintains a "forwarding address," and transmits deltas to the instance that has the new copy of the blob for a certain period of time (e.g., for a certain range of sequence identifiers).

FIGS. 8A-8E illustrate data structures that are used to store metadata in some embodiments. In some embodiments, these data structures exist within the memory space of an executing program or process. In other embodiments, these data structures exist in non-volatile memory, such as magnetic or optical disk drives. In some embodiments, these data structures form a protocol buffer, facilitating transfer of the structured data between physical devices or processes. See, for example, the Protocol Buffer Language Guide, available at http://code.google.com/apis/protocolbuffers/docs/proto.html.

The overall metadata structure 802 includes three major parts: the data about blob generations 804, the data about blob references 808, and inline data 812. In some embodiments, read tokens 816 are also saved with the metadata, but the read tokens are used as a means to access data instead of representing characteristics of the stored blobs.

The blob generations 804 can comprise one or more "generations" of each blob. In some embodiments, the stored blobs are immutable, and thus are not directly editable. Instead, a "change" of a blob is implemented as a deletion of the prior version and the creation of a new version. Each of these blob versions 806-1, 806-2, etc. is a generation, and has its own entry. In some embodiments, a fixed number of generations are stored before the oldest generations are physically removed from storage. In other embodiments, the number of generations saved is set by a blob policy 326. (A policy can set the number of saved generations as 1, meaning that the old one is removed when a new generation is created.) In some embodiments, removal of old generations is intentionally "slow," providing an opportunity to recover an old "deleted" generation for some period of time. The specific metadata associated with each generation 806 is described below with respect to FIG. 8B.

Blob references 808 can comprise one or more individual references 810-1, 810-2, etc. Each reference is an independent link to the same underlying blob content, and each reference has its own set of access information. In most cases there is only one reference to a given blob. Multiple references can occur only if the user specifically requests them. This process is analogous to the creation of a link (a hard link) in a desktop file system. The information associated with each reference is described below with respect to FIG. 8C.

Inline data 812 comprises one or more inline data items 814-1, 814-2, etc. Inline data is not "metadata"—it is the actual content of the saved blob to which the metadata applies. For blobs that are relatively small, access to the blobs can be optimized by storing the blob contents with the metadata. In this scenario, when a client asks to read the metadata, the blobmaster returns the actual blob contents rather than read tokens 816 and information about where to find the blob contents. Because blobs are stored in the metadata table only when they are small, there is generally at most one inline data item 814-1 for each blob. The information stored for each inline data item 814 is described below in FIG. 8D.

Figure 8A:
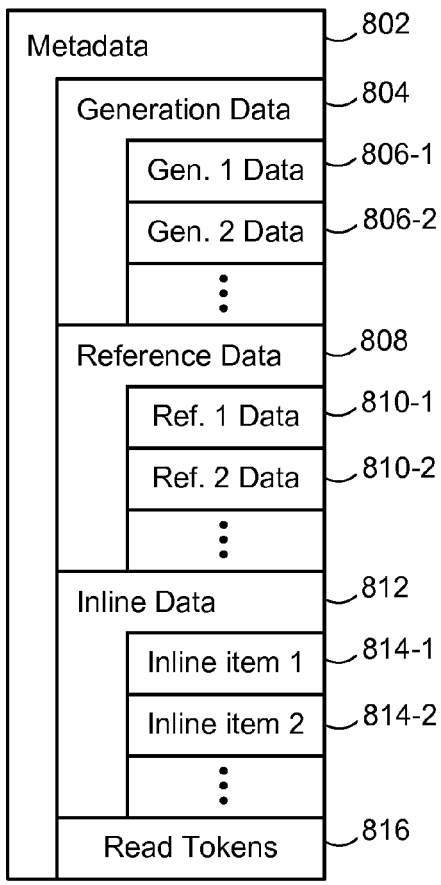
FIGS. 8A-8E illustrate data structures used to store metadata according to some embodiments.
Figure 8B:
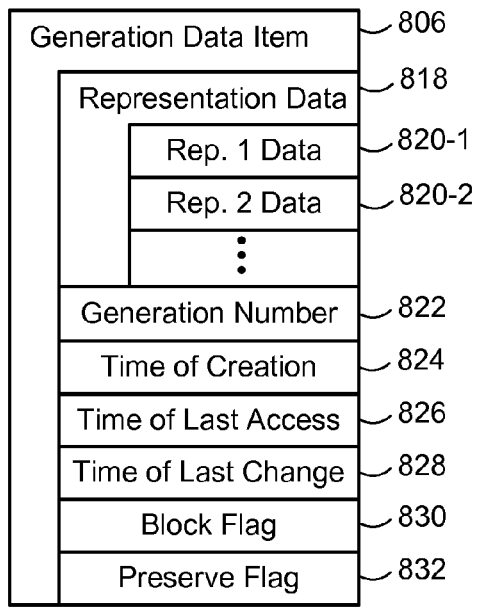

As illustrated in the embodiment of FIG. 8B, each generation 806 includes several pieces of information. In some embodiments, a generation number 822 (or generation ID) uniquely identifies the generation. The generation number can be used by clients to specify a certain generation to access. In some embodiments, if a client does not specify a generation number, the blobmaster 204 will return information about the most current generation. In some embodiments, each generation tracks several points in time. Specifically, some embodiments track the time the generation was created (824). Some embodiments track the time the blob was last accessed by a user (826). In some embodiments, last access refers to end user access, and in other embodiments, last access includes administrative access as well. Some embodiments track the time the blob was last changed (828). In some embodiments that track when the blob was last changed, changes apply only to metadata because the blob contents are immutable. Some embodiments provide a block flag 830 that blocks access to the generation. In these embodiments, a blobmaster 204 would still allow access to certain users or clients who have the privilege or seeing blocked blob generations. Some embodiments provide a preserve flag 832 that will guarantee that the data in the generation is not removed. This may be used, for example, for data that is subject to a litigation hold or other order by a court. In addition to these individual pieces of data about a generation, a generation has one or more representations 818. The individual representations 820-1, 820-2, etc. are described below with respect to FIG. 8E.

Figure 8D:
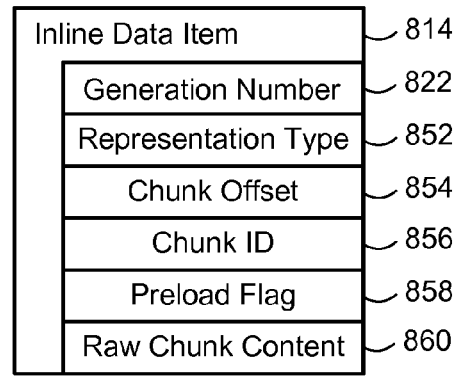
Figure 8C:
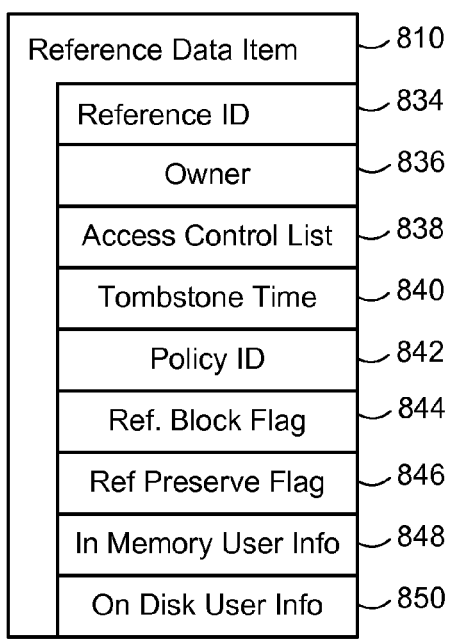

FIG. 8C illustrates a data structure to hold an individual reference according to some embodiments. Each reference 810 includes a reference ID 834 that uniquely identifies the reference. When a user 302 accesses a blob, the user application 308 must specify a reference ID in order to access the blob. In preferred embodiments, each reference has an owner 836, which may be the user or process that created the reference. Each reference has its own access control list ("ACL"), which may specify who has access to the blob, and what those access rights are. For example, a group that has access to read the blob may be larger than the group that may edit or delete the blob. In some embodiments, removal of a reference is intentionally slow, in order to provide for recovery from mistakes. In some embodiments, this slow deletion of references is provided by tombstones. Tombstones may be implemented in several ways, including the specification of a tombstone time 840, at which point the reference will be truly removed. In some embodiments, the tombstone time is 30 days after the reference is marked for removal. In preferred embodiments, certain users or accounts with special privileges can view or modify references that are already marked with a tombstone, and have the rights to remove a tombstone (i.e., revive a blob).

In some embodiments, each reference has its own blob policy, which may be specified by a policy ID 842. The blob policy specifies the number of copies of the blob, where the copies are located, what types of data stores to use for the blobs, etc. When there are multiple references, the applicable "policy" is the union of the relevant policies. For example, if one policy requests 2 copies, at least one of which is in Europe, and another requests 3 copies, at least one of which is in North America, then the minimal union policy is 3 copies, with at least one in Europe and at least one in North America. In some embodiments, individual references also have a block flag 844 and preserve flag 846, which function the same way as block and preserve flags 830 and 832 defined for each generation. In addition, a user or owner of a blob reference may specify additional information about a blob, which may include on disk information 850 or in memory information 848. A user may save any information about a blob in these fields.

FIG. 8D illustrates inline data items 814 according to some embodiments. Each inline data item 814 is assigned to a specific generation, and thus includes a generation number 822. The inline data item also specifies the representation type 852, which, in combination with the generation number 822, uniquely identifies a representation item 820. (See FIG. 8E and associated description below.) In embodiments that allow multiple inline chunks for one blob, the inline data item 814 also specifies the chunk ID 856. In some embodiments, the inline data item 814 specifies the chunk offset 854, which specifies the offset of the current chunk from the beginning of the blob. In preferred embodiments, the chunk offset is specified in bytes. In some embodiments, there is a Preload Flag 858 that specifies whether the data on disk is preloaded into memory for faster access. The contents 860 of the inline data item 814 are stored with the other data elements.

Figure 8E:
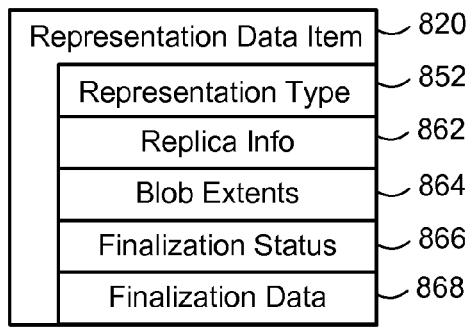

FIG. 8E illustrates a data structure to store blob representations according to some embodiments. Representations are distinct views of the same physical data. For example, one representation of a digital image could be a high resolution photograph. A second representation of the same blob of data could be a small thumbnail image corresponding to the same photograph. Each representation data item 820 specifies a representation type 852, which would correspond to "high resolution photo" and "thumbnail image" in the above example. The Replica Information 862 identifies where the blob has been replicated, the list of storage references (i.e., which chunk stores have the chunks for the blob). In some embodiments, the Replica Information 862 includes other auxiliary data needed to track the blobs and their chunks. Each representation data item also includes a collection of blob extents 864, which specify the offset to each chunk within the blob, to allow reconstruction of the blob.

When a blob is initially created, it goes through several phases, and some embodiments track these phases in each representation data item 820. In some embodiments, a finalization status field 866 indicates when the blob is UPLOADING, when the blob is FINALIZING, and when the blob is FINALIZED. Most representation data items 820 will have the FINALIZED status. In some embodiments, certain finalization data 868 is stored during the finalization process.

One important function of a distributed storage system 200 as shown in FIGS. 1 and 3 is to store data objects uploaded from client applications at different geographical locations. To improve the upload efficiency, a large data object may be divided into multiple chunks and different chunks of the data object may be uploaded into different chunk stores within the distributed storage system in parallel. Therefore, both the client application and the distributed storage system need to have an efficient sanity check mechanism to ensure that the data object has been successfully uploaded into the distributed storage system before the object can be replicated at any instance within the distributed storage system.

Figure 9A:
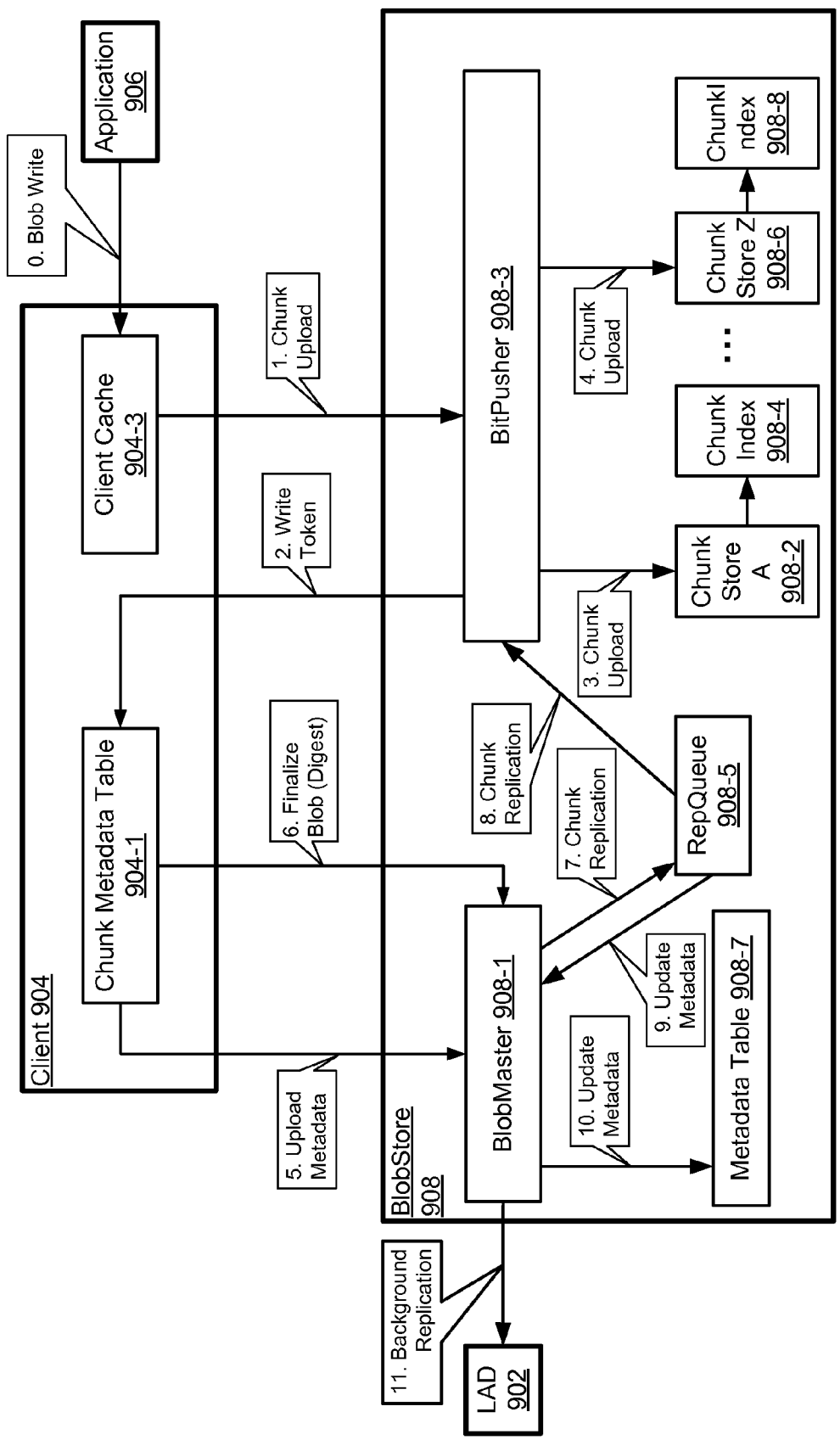
Figure 10A:
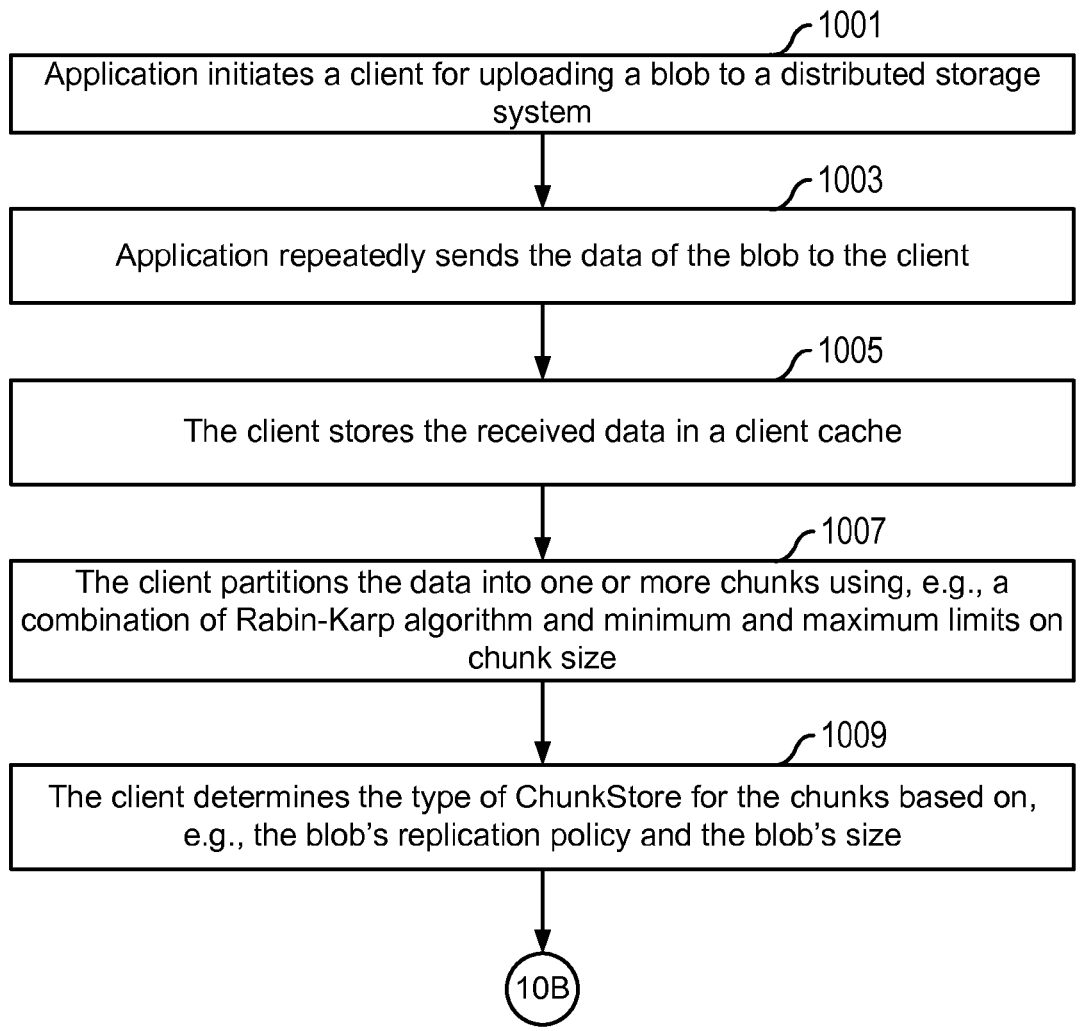
FIGS. 10A-10C illustrate flow charts of computer-implemented methods used for uploading data from a client into a planet-scale distributed storage system according to some embodiments.
Figure 10B:
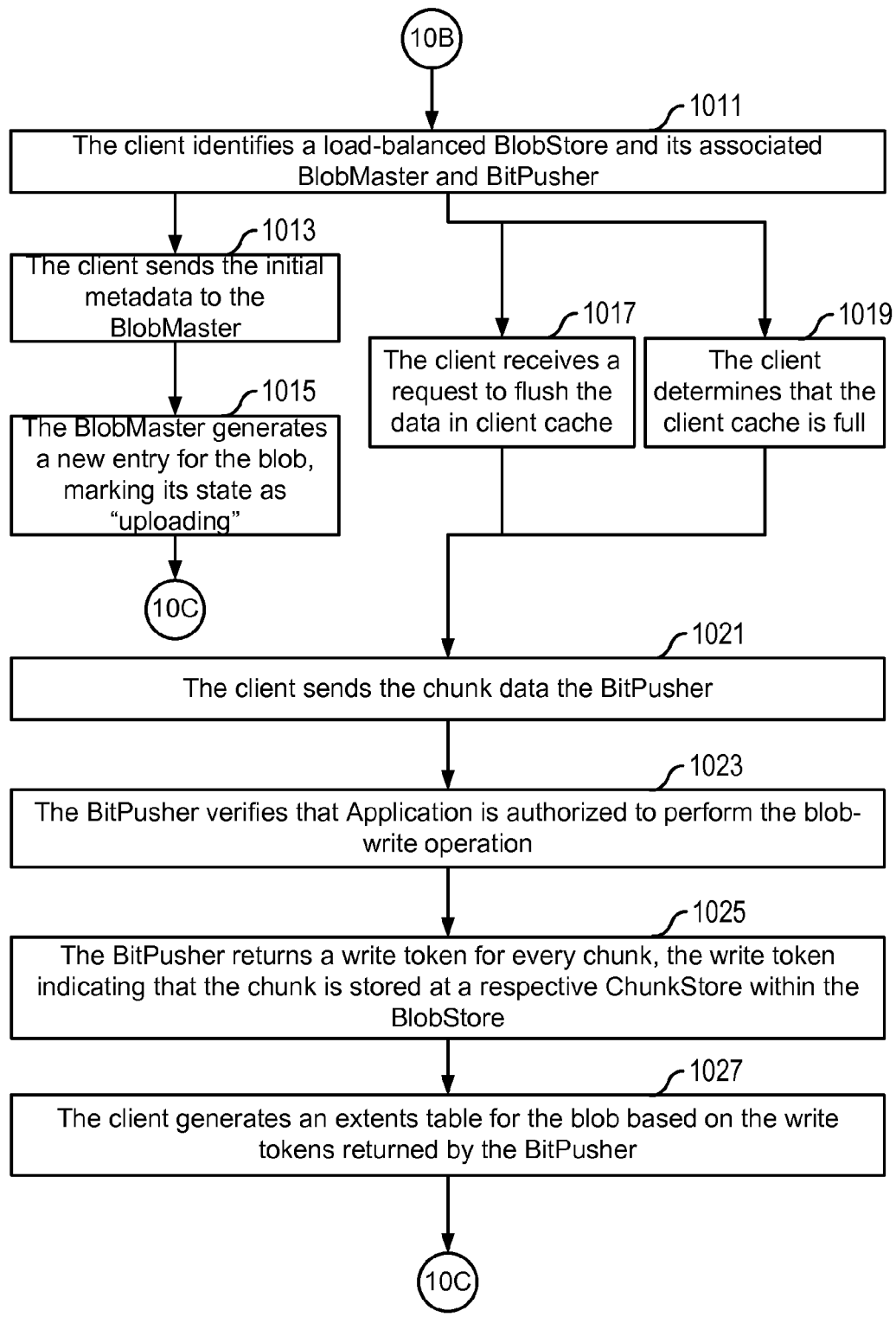
Figure 10C:
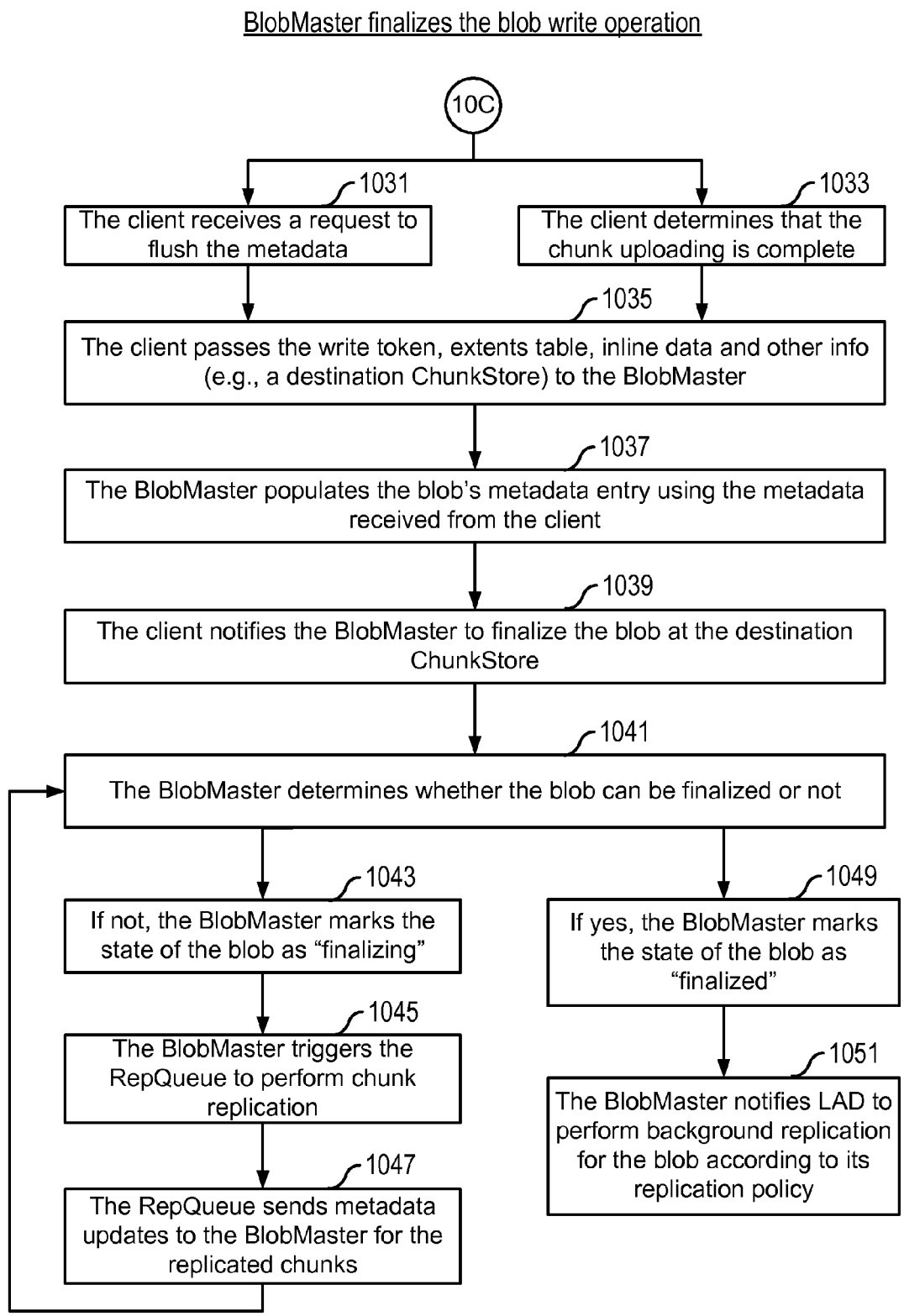

In particular, FIG. 9A depicts a block diagram illustrative of how a blob is uploaded from a client 904 into a blobstore 908, with FIGS. 10A to 10C showing the corresponding flowcharts of this uploading process. FIGS. 9B-9H depict block diagrams of data structures used by different components of the distributed storage system 200 to support this process. For illustrative purposes, FIG. 9A depicts a subset of components of the distributed storage system 200 as shown in FIGS. 1 and 3, including an application 906, a client 904, a blobstore 908, and a LAD 902. Note that the term "blobstore" in this application corresponds to an instance 102 of the system 200 because it stores a plurality of blobs, each blob being a data object (e.g., a database record, an image, a text document, or an audio/video stream) that is comprised of one or more chunks.

As shown in FIG. 9A, the application 906 invokes the client 904 to write a blob into the distributed storage system 200 (1001 of FIG. 10A). In some embodiments, the client 904 is created by the application 906 for writing a data object provided by the application 906 into the distributed storage system 200. The client 904 has an application programming interface (API) for the application 906 to write data associated with the object into a client cache 904-3 of the client 904. The application 906 repeatedly writes data into the client cache 904-3 until it completes the last byte of the data object (1003 of FIG. 10A). The client 904 stores the received data in the client cache 904-3 (1005 of FIG. 10A). In some embodiments, if the client cache 904-3 is full, the application 906 may receive a message from the client 904 to temporarily suspend sending more data to the client 904 until it receives another message from the client 904 indicating that more space is available for receiving data at the client cache 904-3.

Before uploading any data into the distributed storage system 200, the client determines whether the blob should be partitioned into multiple chunks or not based on the blob's size (1007 of FIG. 10A). In some embodiments, different considerations may support different chunk sizes. For example, the client 904 may favor a relatively small chunk size if the distributed storage system uses a content-based chunk de-duplication module to eliminate identical chunks because a relatively small chunk size makes it more likely for two chunks to be identical. As such, a chunk is shared by as many blobs as possible, which could increase the storage efficiency of the distributed storage system. Conversely, the smaller the chunk size the more chunks per blob, which would increase the distributed storage system's overhead for managing a blob. Therefore, a chunk size should be chosen to optimize the overall performance of the distributed storage system.

In some embodiments, the chunk size is set to be multiple megabytes and all the chunks have the same chunk size regardless of the blobs being processed. This approach makes it easy for the client 904 to divide an incoming blob. As long as the data accumulated in the client cache 904-3 reaches a predefined chunk size, a new chunk is ready to be uploaded into the blobstore 908. In some other embodiments, more complex algorithms can be used to choose a chunk size at a blob level such that different blobs may have different chunk sizes. In some embodiments, a chunk size can be determined at a chunk level such that different chunks within the same blob may have different sizes. One of the known algorithms for choosing the chunk size is the Rabin-Karp algorithm that uses hashing to find any one of a set of pattern strings (e.g., chunks) in a text (e.g., a blob). For each partitioned chunk, the client 904 specifies a chunk ID (which, in some embodiments, is a multi-bit (e.g., 160) hash of the chunk's content, a chunk offset (which indicates the chunk's location within the blob, and a chunk size.

In some embodiments, the client 904 generates a chunk metadata record for the blob's chunks in the chunk metadata table 904-1. The chunk metadata record includes the chunk-related metadata some of which is to be uploaded into the blobstore 908's metadata table 908-7. FIG. 9F depicts an exemplary chunk metadata record 960 that includes multiple attributes: a blob base ID 962, a blob reference ID 964, a replication policy 966, the blob's access control information 968, and one or more entries corresponding to the chunks of the blob. For each chunk, the entry (970, 972) includes a chunk ID (970-1, 972-1), a chunk offset (970-3, 972-3), a chunk size (970-5, 972-5), and a write token (970-7, 972-7) Note that the write tokens (970-7, 972-7) are provided by the blobstore 908 for each chunk that has been successfully uploaded into the blobstore 908. Therefore, a chunk that still resides in the client cache 904-3 and has not been uploaded into the blobstore 908 may not have a write token. The blob base ID 962 identifies a particular generation of the blob being uploaded (sometimes in combination with a blob generation ID if the blob has multiple generations). The blob reference ID 964 indicates that the blob being uploaded is now being referenced by the application 906.

In some embodiments, the client 904 also determines a storage type for the blob based on, e.g., the blob's replication policy and the blob's size (1009 of FIG. 10A). As described above in connection with FIG. 3, a particular instance 102 of the distributed storage system 200 includes multiple types of chunk stores such as inline store 212, bigtable store 214 file stores, 216, and tape stores 218. These different storage types are designed for different types of blobs and chunks. In some embodiments, for a blob that requires quick access, the client 904 may specify an express policy that the blob should be stored in the inline chunk stores of a corresponding blobstore. In some other embodiments, the client 904 may adopt a more implicit policy that determines a chunk store type in accordance with the blob size. For example, if the blob size is less than a first threshold level, the chunks should be kept in an inline store 212 (whose overhead is low and access efficiency is high); if the blob size is equal to or greater than the first threshold level but less than a second threshold level, the chunks should be kept in a bigtable store 214 (which is generally more efficient than the file stores 218 when handling blobs within certain size limit); if the blob size is equal to or greater than the second threshold level, the chunks should be kept in a file store 216 (which is generally more efficient for handling large blobs since the overhead is less sensitive to the blob size). Note that there can be multiple instances of chunk stores having the same store type in one blobstore. Therefore, each chunk store has a unique chunk store ID and a combination of a blobstore ID and a chunk store ID uniquely identifies a particular chunk store within a particular blobstore.

In some embodiments, the client 904 identifies a load-balanced blobmaster 908-1 and a load-balanced bitpusher 908-3 of the blobstore 908 (1011 of FIG. 10B). At predefined moments such as when the client cache 904-3 reaches a predefined limit (1019 of FIG. 10B) or when the application 906 expressly instructs the client 904 to upload the data in the client cache 904-3 into the blobstore 908 (1017 of FIG. 10B), the client 904 then contacts the load-balanced bitpusher 908-3 and sends the chunk data to the bitpusher 908-3 (1021 of FIG. 10B). The bitpusher 908-3 verifies whether the application 906 is authorized to perform write operations to the blobstore 908 (1023 of FIG. 10B). If not, the bitpusher 908-3 returns an error message to the client 904 and the blob-write operation is therefore terminated. Otherwise, the bitpusher 908-3 writes the client-provided chunks into the chunk stores of the blobstore 908. In some embodiments, before writing a chunk into any chunk store, the bitpusher 908-3 also checks whether the chunk already has an identical replica in the blobstore 908 as part of a content-based chunk de-duplication step. If an existing chunk of identical content is found in a respective chunk store, the bitpusher 908-3 may return the write token of the existing chunk to the requesting client 904.

Depending on the load balance at the blobstore 908, the bitpusher 908-3 may write different chunks of the same blob into one or more chunk stores 908-2 and 908-6 as shown in FIG. 9A. If there are multiple chunk stores of the same storage type (e.g., bigtable store) that can host new chunks, it would be more efficient for the bitpusher 908-3 (or maybe multiple load-balanced bitpushers) to write different chunks into different chunk stores in parallel. For each chunk, the bitpusher 908-3 returns a write token to the client 904 (1025 of FIG. 10B). In some embodiments, the write token is a cryptographically signed token that includes information about a respective chunk store that hosts a respective chunk of a respective blob.

Upon receipt of the write tokens, the client 904 generates an extents table for the blob using the write tokens (1027 of FIG. 10B). In some embodiments, the extents table is based on the chunk metadata record 960. For each uploaded chunk, there is a corresponding entry in the extents table that includes the chunk-related attributes such as chunk ID, chunk offset, and chunk size. The offsets of different chunks define a sequence for the chunks such that a concatenation of the chunks in accordance with this sequence covers the entire blob. In some embodiments, when the client 904 receives two write tokens that correspond to two consecutive but non-contiguous chunks defined by the sequence, the client 904 inserts a dummy entry into the extents table to indicate that there is a gap of missing data between the two chunks. In some embodiments, the dummy entry corresponds to a dummy chunk that has a predefined chunk ID, a chunk offset that corresponds to the gap's location within the blob and the a chunk size that indicates the amount of missing data.

In some embodiments, the dummy entry corresponds to a dummy chunk, i.e., a non-existing chunk, with a chunk ID, a chunk offset, and chunk size. For example, assuming that a blob has two chunks A and B and the two chunks have been uploaded into the blobstore 908, the extents table of the blob may initially be expressed as follows:

| Chunk Name | Chunk ID | Chunk Offset | Chunk Size |
|---|---|---|---|
| Chunk A | "Content-A" | 0 | 100 |
| Chunk B | "Content-B" | 150 | 70 |

Note that the two chunks are not contiguous and there is a gap of 50 bytes from the end of Chunk A to the beginning of Chunk B, the client 904 may insert another entry into the extents table corresponding to a dummy chunk as follows:

| Chunk Name | Chunk ID | Chunk Offset | Chunk Size |
|---|---|---|---|
| Chunk A | "Content-A" | 0 | 100 |
| Dummy Chunk | "Dummy Content" | 100 | 50 |
| Chunk B | "Content-B" | 150 | 70 |

In some embodiments, the dummy entries in the extents table are used as a placeholder by the client 904 to suggest that the blob has some missing data. Of course, there will be no dummy entries in the extents table if the blob being uploaded has no missing data and any two consecutive chunks are always contiguous.

In some embodiments, the client 904 also uploads the metadata in the chunk metadata table 904-1 into the blobstore 908 by sending the metadata to the blobmaster 908-1 (1013 of FIG. 10B). In some embodiments, this occurs after the client 904 has uploaded all the chunks into the blobstore 908 (1033 of FIG. 10C) and therefore there is a chunk metadata record 960 and a corresponding entry in the extents table for every uploaded chunk. In some other embodiments, the metadata upload is triggered by an express request from the application 906 (1031 of FIG. 10C). In this case, the client 904 may perform multiple metadata upload operations at different times. Using the uploaded metadata, the blobmaster 908-1 generates a new entry in the metadata table 908-7 (1015 of FIG. 10B). FIGS. 8A to 8E, as described above, depict the data structures of a blob's metadata entry in the metadata table 908-7. In particular, one upload of a blob corresponds to one generation of the blob. Depending on its replication policy, a blob may have multiple generations and each generation has its own set of chunks in a respective chunk store. The finalization status 866 of a blob indicates the current status of the blob in the blobstore. Initially, the blobmaster 908-1 marks the finalization status of the newly-generated entry in the metadata table 908-7 as being "uploading," indicating that not all the chunks of the same blob have been uploaded to the blobstore 908.

In some embodiments, the client 904 provides the blob metadata including all the write tokens received by the client 904, the blob's access control list, extents table, and replication policy, as well as the actual chunk contents if the client 904 determines that the blob's chunks should be stored as inline data (1035 of FIG. 10C). As soon as the blobmaster 908-1 inserts the metadata into the metadata table (1037 of FIG. 10C), the blobmaster 908-1 is ready for receiving and processing other access requests to the blob.

In some embodiments, after uploading the last chunk into the blobstore 908 (e.g., upon receipt of the corresponding write token), the client 904 sends a notification to the blobmaster 908-1 to finalize the blob at a client-specified destination chunk store (1039 of FIG. 10C). In addition to making this request, the client 904 also clears its client cache 904-3 for other use. In some embodiments, the client 904 determines the destination chunk store by examining the write tokens and the extents table to determine whether all the chunks are located within the same chunk store (e.g., chunk store A 908-2 or chunk store Z 908-6). If they are not located within the same chunk store, the client 904 may identify a chunk store that has more chunks of the same blob than any other chunk store as the destination chunk store and provide information about the destination chunk store as part of its request to finalize the blob uploading. FIG. 9G depicts an exemplary data structure of a chunk store metadata record 980 that includes: a blob base ID 982, a blob reference ID 984, and the number of bytes 986-1 for each chunk store that has at least one chunk for a corresponding blob. From this record, the client 904 can easily tell which chunk store has the highest number of chunks for a respective blob and then choose the chunk store as the destination chunk store.

In some embodiments, the distributed storage system 200 requires that all chunks related to the same blob be within the same chunk store to make the other operations (e.g., chunk deletion or chunk replication) more efficient. Accordingly, the blobstore 908 needs to relocate chunks at different chunk stores into the same chunk store, which is also referred to as the "destination chunk store" (or "canonical chunk store"). Based on the client-provided information, the blobmaster 908-1 determines whether all the chunks are within the same chunk store or not (1041 of FIG. 10C). If true, the blobmaster 908-1 then marks the finalization status of the blob in the metadata table as "finalize" (1049 of FIG. 10C). In addition, the blobmaster 908-1 notifies the LAD 902 that the blob is ready to be replicated to the other blobstores in accordance with the blob's replication policy (1051 of FIG. 10C). If false, the blobmaster 908-1 marks the finalization status as "final-izing" (1043 of FIG. 10C) and triggers the repqueue 908-5 to perform the chunk-level replication by moving the chunks from those non-destination chunk stores to the destination chunk store (1045 of FIG. 10C). For each relocated chunk, the repqueue 908-5 sends a metadata update to the blobmaster 908-1 for updating the blob's extents table in the metadata table 908-7 (1047 of FIG. 10C). This chunk relocation process is supported by the additional data structures as shown in FIGS. 9B to 9E.

In particular, FIG. 9D depicts an exemplary chunk replication request 940 that includes multiple attributes: a replication ID 942, a blob base ID 944, a blob generation ID 946, a representation type 947, a chunks list 948, and a replication priority 949. In some embodiments, the replication ID 942 further includes a source chunk store ID that identifies a chunk store 908-2 within the blobstore 908, a destination chunk store ID that identifies a chunk store 908-6 within the same blobstore 908, a user ID that initiates the replication, and a network quality of service parameter. A combination of the blob base ID 944 and the blob generation ID 946 uniquely identifies a particular generation of the blob to be replicated. In some embodiments, both parameters are originally provided by the client who initiates the access request for the blob. The chunks list 948 typically includes one or more pairs of chunk ID and chunk sequence ID, each pair uniquely identifying a chunk within the corresponding chunk store. The replication priority 949 indicates whether this is a high-priority real-time/dynamic replication or a low-priority background replication.

FIG. 9C depicts a data structure of an exemplary chunk reference record 930 that includes multiple attributes: a chunk ID 932, a chunk sequence ID 934, a storage reference 936 comprising a blobstore ID 936-1 and a chunkstore ID 936-3, and blob reference metadata 938 including a blob base ID 938-1, a blob generation ID 938-3, a chunk offset within the blob 938-5, a chunk size 938-7, and an optional representation type 938-9. In some embodiments, the chunk ID 932 is a content hash that has multiple bits (e.g., 64 or 160). Because the same chunk may have different incarnations corresponding to different blobs, the chunk sequence ID 934 is used for identifying a particular incarnation of a chunk using, e.g., the chunk creation timestamp.

For each chunk relocated from the chunk store A 908-2 to the chunk store Z 908-6, the bitpusher 908-3 generates a chunk index record for the new chunk using the chunk reference record at the chunk index table 908-4 and inserts the chunk index record into the chunk store Z 908-6's chunk index table 908-8.

FIG. 9B depicts a data structure of an exemplary chunk index record 920 that includes multiple attributes: a short chunk ID 922, a storage reference 924 comprising a blobstore ID 924-1 and a chunkstore ID 924-3, chunk metadata 926 (further including a long chunk ID 926-1, a chunk creation time 926-3, a reference count 926-5, an incarnation (or sequence) ID 926-7, and a chunk size 926-9), and blob references list 928 that identifies one or more blobs that include the chunk as a port of the blob (each blob reference further including a blob base ID 928-1, a blob generation ID 928-3, a chunk offset within the blob 928-5, and an optional representation type 928-7). In some embodiments, the short chunk ID 922 is exposed to the client while the long chunk ID 926-1 is for internal use by the distributed storage system.

FIG. 9E depicts a data structure of an exemplary metadata update record 950 that includes multiple attributes: a blob base ID 952, a blob reference ID 954, and an extents table delta 956 that identifies a chunk store in which a chunk resides. In some embodiments, the blob base ID 954 uniquely identifies a corresponding metadata entry in the metadata table and the blob reference ID 956 identifies a reference metadata sub-entry within the metadata entry. A more detailed description of the reference metadata sub-entry is provided above in connection with FIG. 8C.

For each newly-relocated chunk, the blobmaster 908-3 checks the extents table to determine if the chunks associated with the same blob are all within the same chunk store Z 908-7 of the blobstore 908. If so, the blobmaster 908-3 updates the finalization status of the blob from "finalizing" to "finalized," indicating that the uploading of the client-provided object from the client 904 to the blobstore 908 is successfully completed.

In some embodiments, the blobmaster 908-1 determines whether the blob can be finalized based on a digest of extents table provided by the client 904. As described above, the client 904 inserts a dummy entry into the extents table for each pair of consecutive but non-contiguous chunks When the client 904 decides that all the chunks have been uploaded, it sends to the blobmaster 908-1 a digest of the blob's extents table as part of the blob finalization request. FIG. 9H depicts an exemplary data structure of a blob digest record 990 that includes: a blob base ID 992, a blob reference ID 994, a total number 996 of chunks of the blob (not including the dummy chunks), and a hash 998 of all the entries in the extents table described above. Upon receipt of the digest, the blobmaster 908-1 compares the total number 996 of chunks (which is the number of chunks that the client 904 expects to be within the distributed storage system 200) and the number of chunks it has (e.g., in accordance with the number of read tokens in the blob's metadata record). If the two numbers do not match, the blobmaster 908-1 returns an error message to the client 904, indicating that it does not have all the chunks at place. In response, the client 904 may resend the chunks missing from the blobstore. As such, the blobmaster 908-1 can make a quick determination as to the status of the uploaded chunks without calculating another digest of the extents table using the blob's metadata in the metadata table 908-7 and then comparing the two digests, which is a more expensive operation. Note that this content-consistency protection mechanism works regardless of how a chunk ID is defined as long as both the client 904 and the blobmaster 908-1 share the same definition on the chunk ID. The hash of the content-based chunk IDs for an entire blob effectively encodes the blob's content rather than the contents of one or more chunks, which provides an improved security on the comparison result.

In some embodiments, the client 904 does not insert a dummy entry into its extents table for each gap between two consecutive but non-contiguous chunks as described above. Each entry in the extents table corresponds to an actual chunk that has been uploaded into the distributed storage system. In this case, a digest of the extents table implicitly states whether there is any data missing from an uploaded blob. By comparing the client-provided digest and a digest generated by the blobmaster 908-1, it is still possible for identifying what range of data is missing from the blob originally processed by the client 904. The blobmaster 908-1 maintains the information for any future client access to the blob to protect its data integrity.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for uploading an object into a distributed storage system, wherein the distributed storage system includes a plurality of chunk stores, comprising:

at a computing device, distinct from the distributed storage system, having one or more processors and memory storing programs executed by the one or more processors, wherein the computing device is connected to the distributed storage system through a network:
splitting an object into one or more chunks, wherein the one or more chunks have a predefined sequence and a respective chunk has a chunk ID, a chunk offset, and a chunk size;
uploading the one or more chunks into the distributed storage system;
for a respective uploaded chunk,
receiving a write token from the distributed storage system after the respective uploaded chunk has been stored into the distributed storage system, wherein the write token identifies a respective chunk store that stores the uploaded chunk and includes the chunk ID, the chunk offset, and chunk size of the uploaded chunk;
inserting an entry into an extents table of the object for the uploaded chunk in accordance with the write token received from the distributed storage system, the write token indicating the respective chunk store and including the chunk ID, chunk offset, and chunk size of the uploaded chunk, wherein the extents table is stored at the computing device;
generating a digest of the extents table, wherein the digest represents the one or more chunks that a client expects to be within the distributed storage system, the digest indicating a total number of client-expected chunks; and
sending the digest of the extents table to the distributed storage system, wherein the distributed storage system uses the digest to determine whether it has each of the one or more client-expected chunks, including by comparing the total number of client-expected chunks with a number of chunks of the object stored in the distributed storage system, wherein the computing device re-uploads any missing chunks of the object into the distributed storage system.

2. The computer-implemented method of claim 1, further comprising:
inserting a dummy entry into the extents table for a respective gap between two consecutive but non-contiguous chunks of the object in accordance with the predefined sequence.

3. The computer-implemented method of claim 2, wherein the dummy entry corresponds to a dummy chunk that has a predefined chunk ID, a chunk offset, and a chunk size.

4. The computer-implemented method of claim 1, wherein the client is configured to choose a destination chunk store for the object to be the chunk store that has more bytes of the object than any other chunk stores of the distributed storage system.

5. The computer-implemented method of claim 1, wherein the one or more chunks have the same chunk size.

6. The computer-implemented method of claim 1, wherein at least two of the one or more chunks have two different chunk sizes.

7. The computer-implemented method of claim 1, wherein each of the plurality of chunk stores has a respective store type, and uploading the one or more chunks to the plurality of chunk stores further comprises:
choosing a store type in accordance with a total size of the object and a user-specified storage policy for the object; and
notifying the distributed storage system of the chosen store type such that the one or more chunks are uploaded into a subset of the plurality of chunk stores that have the chosen store type.

8. The computer-implemented method of claim 1, wherein the write token further includes, the respective chunk store's chunkstore ID and a cryptographic signature associated with the uploaded chunk.

9. The computer-implemented method of claim 1, wherein the extents table defines a map from a logical byte range of the object to one or more chunk IDs of the one or more chunks stored within the distributed storage system.

10. The computer-implemented method of claim 1, wherein the digest of the extents table further includes a total number of chunks of the object that the client expects to be within the distributed storage system.

11. A computer-implemented method for storing an object within a plurality of chunk stores of a distributed storage system, comprising:
at a computing device having one or more processors and memory storing programs executed by the one or more processors, wherein the computing device is connected to the distributed storage system through a network:
receiving from a client a request to store an object having one or more chunks, wherein the one or more chunks have a predefined sequence and a respective chunk has a chunk ID, a chunk offset, and a chunk size;
for a respective received chunk,
identifying a respective chunk store in accordance with a load balance of the distributed storage system;
storing the received chunk within the respective chunk store; and
returning a write token for the received chunk to the client after the received chunk has been stored into the distributed storage system, wherein the client inserts an entry into an extents table of the object for the received chunk in accordance with the write token, the write token indicating the respective chunk store and including the chunk ID, chunk offset, and chunk size of the received chunk;
receiving a digest of the extents table of the object from the client, wherein the digest represents the one or more chunks that the client expects to be within the distributed storage system, the digest indicating a total number of client-expected chunks; and
determining whether the distributed storage system has the one or more client-expected chunks in accordance with the received digest, including by comparing the total number of client-expected chunks with a number of chunks of the object stored in the distributed storage system, wherein the client re-uploads any missing chunks of the object into the distributed storage system.

12. The computer-implemented method of claim 11, wherein the digest includes information of at least one dummy entry in the extents table, and wherein the dummy entry corresponds to a gap between two consecutive but non-contiguous chunks of the object in accordance with the predefined sequence.

13. The computer-implemented method of claim 12, wherein the dummy entry corresponds to a dummy chunk that has a predefined chunk ID, a chunk offset, and a chunk size.

14. The computer-implemented method of claim 11, further comprising:
identifying a destination chunk store for the object as the chunk store that has more bytes of the object than any other chunk stores of the distributed storage system; and
transferring the received chunks from a non-destination chunk stores to the destination chunk store.

15. The computer-implemented method of claim 11, wherein the one or more chunks have the same chunk size.

16. The computer-implemented method of claim 11, wherein at least two of the one or more chunks have two different chunk sizes.

17. The computer-implemented method of claim 11, wherein each of the plurality of chunk stores has a respective store type and a chunk store is chosen for storing a chunk of the object if its store type is the same as a client-chosen store type.

18. The computer-implemented method of claim 11, wherein a respective write token includes a respective chunk store's chunkstore ID and a cryptographic signature associated with the uploaded chunk.

19. The computer-implemented method of claim 11, wherein the extents table defines a map from a logical byte range of the object to one or more chunk IDs of the one or more chunks.

20. The computer-implemented method of claim 11, wherein the digest of the extents table further includes a total number of chunks that the client expects to be within the distributed storage system.

21. A computer system for managing a distributed storage system, comprising:
one or more processors;
memory; and
one or more programs stored in the memory for execution by the one or more processors, the one or more programs comprising instructions to perform:
receiving from a client a request to store an object having one or more chunks, wherein the one or more chunks have a predefined sequence and a respective chunk has a chunk ID, a chunk offset, and a chunk size;
for a respective received chunk,
identifying a respective chunk store in accordance with a load balance of the distributed storage system;
storing the received chunk within the respective chunk store; and
returning a write token for the received chunk to the client after the received chunk has been stored into the distributed storage system, wherein the client inserts an entry into an extents table of the object for the received chunk in accordance with the write token, the write token indicating the respective chunk store and including the chunk ID, chunk offset, and chunk size of the received chunk;
receiving a digest of the extents table of the object from the client, wherein the digest represents the one or more chunks that the client expects to be within the distributed storage system, the digest indicating a total number of client-expected chunks; and
determining whether the distributed storage system has the one or more client-expected chunks in accordance with the received digest, including by comparing the total number of client-expected chunks with a number of chunks of the object stored in the distributed storage system, wherein the client re-uploads any missing chunks of the object into the distributed storage system.

22. A non-transitory computer readable storage medium storing one or more programs configured for execution by a server computer system having one or more processors and memory storing one or more programs for execution by the one or more processors, the one or more programs comprising instructions to:

receive from a client a request to store an object having one or more chunks, wherein the one or more chunks have a predefined sequence and a respective chunk has a chunk ID, a chunk offset, and a chunk size;

for a respective received chunk,
identify a respective chunk store in accordance with a load balance of the distributed storage system;
store the received chunk within the respective chunk store; and
return a write token for the received chunk to the client after the received chunk has been stored into the distributed storage system, wherein the client inserts an entry into an extents table of the object for the received chunk in accordance with the write token, the write token indicating the respective chunk store and including the chunk ID, chunk offset, and chunk size of the received chunk;

receive a digest of the extents table of the object from the client, wherein the digest represents the one or more chunks that the client expects to be within the distributed storage system, the digest indicating a total number of client-expected chunks; and determine whether the distributed storage system has the one or more client-expected chunks in accordance with the received digest, including by comparing the total number of client-expected chunks with a number of chunks of the object stored in the distributed storage system, wherein the client re-uploads any missing chunks of the object into the distributed storage system.

* * * * *